United States Patent [19]
Buckley et al.

[11] Patent Number: 5,173,651
[45] Date of Patent: Dec. 22, 1992

[54] ELECTRICAL DRIVE SYSTEMS

[75] Inventors: Maurice Buckley, Blackrock; Arthur Stone, Kilmallock; Aengus Murray, Dublin, all of Ireland

[73] Assignee: Kollmorgen Technologies Corporation, Dallas, Tex.

[21] Appl. No.: 220,070

[22] Filed: Jul. 15, 1988

Related U.S. Application Data

[62] Division of Ser. No. 755,786, Jul. 17, 1985, Pat. No. 4,782,272.

[30] Foreign Application Priority Data

Jun. 28, 1985 [IE] Ireland ................................. 1629/85

[51] Int. Cl.⁵ .............................................. H02P 7/36
[52] U.S. Cl. ..................................... 318/701; 310/106; 310/187; 310/816; 310/254
[58] Field of Search .............................. 310/198–207, 310/179, 180, 183–188, 156, 254, 216, 106; 318/701

[56] References Cited

U.S. PATENT DOCUMENTS

| | | |
|---|---|---|
| 3,200,315 | 9/1961 | Thompson . |
| 3,805,134 | 4/1974 | Osamu et al. . |
| 3,908,130 | 9/1975 | Lafuze . |
| 4,115,715 | 9/1978 | Muller . |
| 4,125,796 | 11/1978 | Nagase et al. . |
| 4,127,787 | 11/1978 | Auinger ........................ 310/198 U X |
| 4,144,470 | 3/1979 | Auinger ........................ 310/198 |
| 4,163,915 | 8/1979 | Fong ........................ 310/198 |
| 4,208,621 | 6/1980 | Hipkins et al. . |
| 4,217,508 | 8/1980 | Uzuka . |
| 4,228,384 | 10/1980 | Arnold, Jr. et al. . |
| 4,249,116 | 2/1981 | Frosch . |
| 4,280,072 | 7/1981 | Gotou et al. . |
| 4,284,919 | 8/1981 | Auinger ........................ 310/198 |
| 4,286,184 | 8/1981 | Kogler et al. . |
| 4,298,621 | 11/1981 | Hipkins et al. . |
| 4,311,933 | 1/1982 | Riggs et al. . |
| 4,353,016 | 10/1982 | Born . |
| 4,356,437 | 10/1982 | Saito et al. . |
| 4,368,411 | 1/1983 | Kidd . |
| 4,490,661 | 12/1984 | Brown et al. . |
| 4,494,051 | 1/1985 | Bailey . |
| 4,546,293 | 10/1985 | Peterson et al. . |
| 4,554,473 | 11/1985 | Muller . |
| 4,564,796 | 1/1986 | Yoshino et al. . |
| 4,583,015 | 4/1986 | Toshimitsu ........................ 310/187 |
| 4,594,620 | 6/1986 | Shoji et al. . |
| 4,598,240 | 7/1986 | Gale et al. . |
| 4,692,646 | 9/1987 | Gotou ........................ 310/184 |
| 4,698,542 | 10/1987 | Muller . |
| 4,782,272 | 11/1988 | Buckley et al. ........................ 318/254 |
| 4,874,975 | 10/1989 | Hertrich ........................ 310/179 |

FOREIGN PATENT DOCUMENTS

| | | |
|---|---|---|
| 0089150 | 9/1983 | European Pat. Off. . |
| 1218503 | 6/1966 | Fed. Rep. of Germany . |
| 2850478 | 2/1981 | Fed. Rep. of Germany . |
| 2850478 | 2/1981 | Fed. Rep. of Germany . |
| 3118289 | 3/1982 | Fed. Rep. of Germany . |
| 3144630 | 5/1983 | Fed. Rep. of Germany . |
| 1584258 | 12/1969 | France . |

(List continued on next page.)

Primary Examiner—R. Skudy
Attorney, Agent, or Firm—Morgan & Finnegan

[57] ABSTRACT

A direct current brushless electric motor has a rotor, and a stator with inwardly extending teeth, between each pair of which a winding slot is defined. The radially inward face of each tooth has a dummy slot shaped so the reluctance forces between rotor and stator due to the presence of the dummy slots are the same as those due to the winding slots. Motor control arrangement incorporates a current feedback loop based on the incoming phase of each phase combination in the phase energization sequence in a driving mode and phase changeover may be initiated by Hall devices, two for each transition point, underlying the axial ends of the rotor magnets. The control arrangement may incorporate a pulse width modulation power supply permitting the establishment of bias currents under motor standstill conditions.

7 Claims, 27 Drawing Sheets

FOREIGN PATENT DOCUMENTS

| | | |
|---|---|---|
| 2392525 | 12/1978 | France . |
| 45-20858 | 7/1970 | Japan . |
| 45-25050 | 8/1970 | Japan . |
| 55-71161 | 5/1980 | Japan . |
| 55-71162 | 5/1980 | Japan .................. 310/185 U X |
| 55-71163 | 5/1980 | Japan . |
| 58-207853 | 12/1983 | Japan . |
| 2001481A | 1/1979 | United Kingdom . |
| 2020915A | 11/1979 | United Kingdom . |
| 2126026 | 3/1984 | United Kingdom . |
| 2126926A | 3/1984 | United Kingdom . |

OTHER PUBLICATIONS

Basic Electrotechnics by B. L. Goodlet; (No Month) 1962; E. Arnold (Publishers) Ltd; London, Gr. Britain.
Novel Design and Control Of a Trapezoidal Back EMF Motor—The Smooth Transition From Brush to Brushless D.C.; A. C. Stone and M. G. Buckley; Inland Division, Kollmorgen (Ireland) Ltd., Ennis, Ireland. Apr. 1985.
IEE Transactions on Power Apparatus and Systems, vol. PAS 101, No. 3 Mar. 1982 "The Bulb-Type Generators Of Rock Island Power Station and Their Novel Cooling System"—G. L. Ruelle.
Patent Abstracts of Japan, vol. 4, No. 112(E-21)[594], Aug. 12, 1980; and JP-A-55 71163 (Matshushita) May 29, 1980.
Electronically Commutated D.C. Feed Drives for Machine Tools; P. Zimmerman, Robert Bosch GmbH: Geschaftsbereich Industrieausrustung, 6120 Erbach, Germany Sep. 1982.
Ultra High Performance Brushless D.C. Drive; A. C. Stone 2nd M. G. Buckley; Inland Motor Division, Kollmorgen (Ireland) Ltd., Ennis, Ireland—Oct. 24-26, 1984.
Electric Motor Control, Van Nostrand Reinhold, Co., (No Month) 1975, pp. 105-110; Walter N. Alerich.

Fig.1.
PRIOR ART
Fig.6.
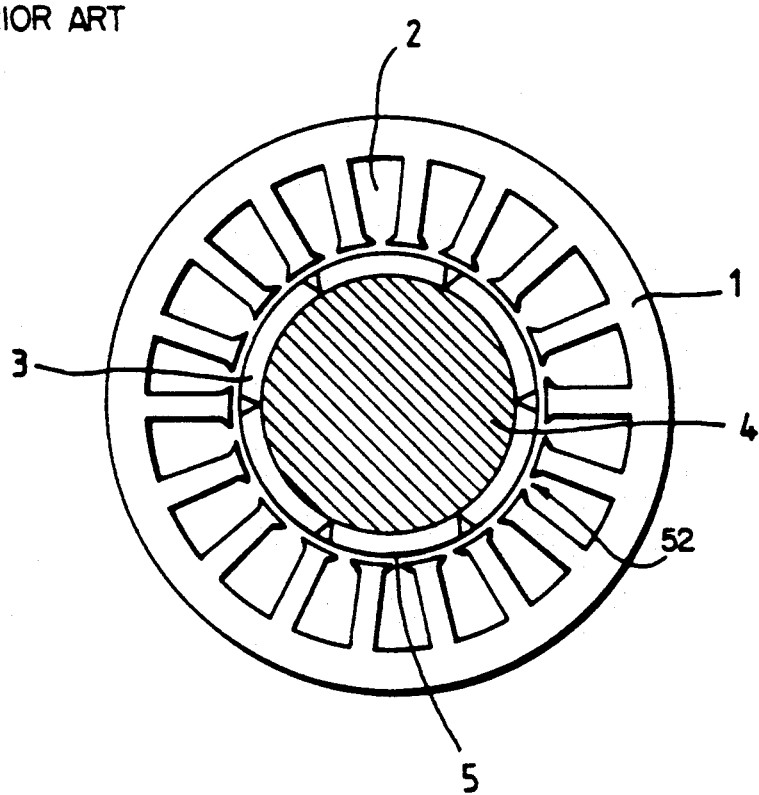
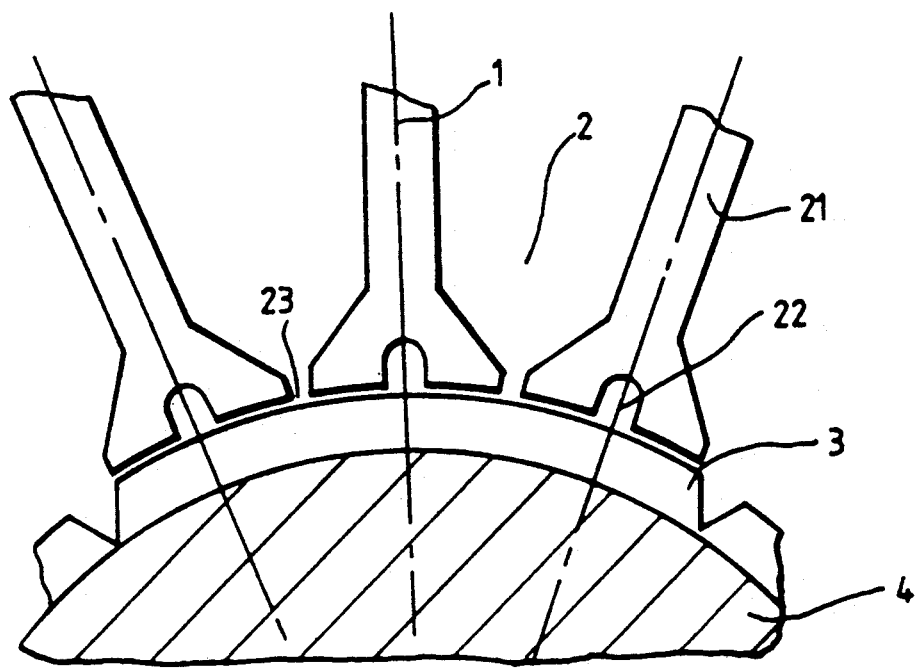

Fig. 5.
PRIOR ART

| MODE | DESIRED DIRECTION | HALL SW | ILLEGAL CODES 101 010 CBA 001 | 011 | 111 | 110 | 100 | 000 |
|---|---|---|---|---|---|---|---|---|
| REVERSE (ANTICLOCKWISE) READ LEFT TO RIGHT | 0 | PHASES | CA | CB | AB | AC | BC | BA |
| | | CURRENT SAMPLE | C | C | A | A | B | B |
| FORWARD (CLOCKWISE) READ RIGHT TO LEFT. | 1 | PHASES | AC | BC | BA | CA | CB | AB |
| | | CURRENT SAMPLE | C | C | A | A | B | B |

Fig. 13.

| MODE | PWM FORWARD | PWM REVERSE | DIRECTION | HALL SW. | CBA 001 | 011 | 111 | 110 | 100 | 000 |
|---|---|---|---|---|---|---|---|---|---|---|
| PWM OFF | 0 | 0 | 0 | PHASES | — | — | — | — | — | — |
|  | 0 | 0 | 0 | CURRENT SAMPLE | — | — | — | — | — | — |
| REVERSE BRAKING READ LEFT TO RIGHT | 0 | 1 | 0 | PHASES | AC | BC | BA | CA | CB | AB |
|  | 0 | 1 | 0 | CURRENT SAMPLE | +C | -B | +A | -C | +B | -A |
| REVERSE DRIVING READ LEFT TO RIGHT | 1 | 0 | 0 | PHASES | CA | CB | AB | AC | BC | BA |
|  | 1 | 0 | 0 | CURRENT SAMPLE | +C | -B | +A | -C | +B | -A |
| LOGIC ERROR | 1 | 1 | 0 | PHASES | — | — | — | — | — | — |
|  | 1 | 1 | 0 | CURRENT SAMPLE | — | — | — | — | — | — |
| PWM OFF | 0 | 0 | 1 | PHASES | — | — | — | — | — | — |
|  | 0 | 0 | 1 | CURRENT SAMPLE | — | — | — | — | — | — |
| FORWARD BRAKING READ RIGHT TO LEFT | 1 | 0 | 1 | PHASES | CA | CB | AB | AC | BC | BA |
|  | 1 | 0 | 1 | CURRENT SAMPLE | -A | +C | -B | +A | -C | +B |
| FORWARD DRIVING READ RIGHT TO LEFT | 0 | 1 | 1 | PHASES | AC | BC | BA | CA | CB | AB |
|  | 0 | 1 | 1 | CURRENT SAMPLE | -A | +C | -B | +A | -C | +B |
| LOGIC ERROR | 1 | 1 | 1 | PHASES | — | — | — | — | — | — |
|  | 1 | 1 | 1 | CURRENT SAMPLE | — | — | — | — | — | — |

Fig. 14.

| MODE | PWM FORWARD | PWM REVERSE | DIRECTION | HALL SW | FED CBA 000 000 | 000 001 | 001 001 | 001 011 | 011 011 | 011 111 | 111 111 | 111 110 | 110 110 | 110 100 | 100 100 | 100 000 |
|---|---|---|---|---|---|---|---|---|---|---|---|---|---|---|---|---|
| REVERSE DRIVING READ LEFT TO RIGHT | 1 | 0 | 0 | PHASES | BA | BA | CA | CA | CB | CB | AB | AB | AC | AC | BC | BC |
| | | | | CURRENT SAMPLE | -A | -A | +C | +C | -B | -B | +A | +A | -C | -C | +B | +B |
| REVERSE BRAKING READ LEFT TO RIGHT | 0 | 1 | 0 | PHASES | AB | AB | AC | AC | BC | BC | BA | BA | CA | CA | CB | CB |
| | | | | CURRENT SAMPLE | -A | -A | +C | +C | -B | -B | +A | +A | -C | -C | +B | +B |
| FORWARD DRIVING READ RIGHT TO LEFT | 0 | 1 | 1 | PHASES | AB | AC | AC | BC | BC | BA | BA | CA | CA | CB | CB | AB |
| | | | | CURRENT SAMPLE | +B | -A | -A | +C | +C | -B | -B | +A | +A | -C | -C | +B |
| FORWARD BRAKING READ RIGHT TO LEFT | 1 | 0 | 1 | PHASES | BA | CA | CA | CB | CB | AB | AB | AC | AC | BC | BC | BA |
| | | | | CURRENT SAMPLE | +B | -A | -A | +C | +C | -B | -B | +A | +A | -C | -C | +B |

Fig. 17.

| MODE | FORWARD | REVERSE | DIRECTION | WT | HALL SW | FED CBA 000 000 | 000 001 | 001 001 | 001 011 | 011 011 | 001 111 | 111 111 | 111 110 | 110 110 | 110 100 | 100 100 | 100 000 |
|---|---|---|---|---|---|---|---|---|---|---|---|---|---|---|---|---|---|
| REVERSE LOW SPEED BRAKING  READ LEFT TO RIGHT →  | 0 | 1 | 0 | 0 | PHASES | AB | AB | AC | AC | BC | BC | BA | BA | CA | CA | CB | CB |
| | | | | | CURRENT SAMPLE | -A | -A | +C | +C | -B | -B | +A | +A | -C | -C | +B | +B |
| REVERSE HIGH SPEED BRAKING  READ LEFT TO RIGHT → | 0 | 1 | 0 | 1 | PHASES | AB | AB | AC | AC | BC | BC | BA | BA | CA | CA | CB | CB |
| | | | | | CURRENT SAMPLE | +B | +B | -A | -A | +C | +C | -B | -B | +A | +A | -C | -C |
| FORWARD LOW SPEED DRIVING  READ RIGHT TO LEFT ← | 0 | 1 | 1 | 0 | PHASES | AB | AC | AC | BC | BC | BA | BA | CA | CA | CB | CB | AB |
| | | | | | CURRENT SAMPLE | +B | -A | -A | +C | +C | -B | -B | +A | +A | -C | -C | +B |
| FORWARD HIGH SPEED DRIVING  READ RIGHT TO LEFT ← | 0 | 1 | 1 | 1 | PHASES | AB | AC | AC | BC | BC | BA | BA | CA | CA | CB | CB | AB |
| | | | | | CURRENT SAMPLE | -A | +C | +C | -B | -B | +A | +A | -C | -C | +B | +B | -A |
| REVERSE LOW SPEED DRIVING  READ LEFT TO RIGHT → | 1 | 0 | 0 | 0 | PHASES | BA | CA | CA | CB | CB | AB | AB | AC | AC | BC | BC | BA |
| | | | | | CURRENT SAMPLE | -A | +C | +C | -B | -B | +A | +A | -C | -C | +B | +B | -A |
| REVERSE HIGH SPEED DRIVING  READ LEFT TO RIGHT → | 1 | 0 | 0 | 1 | PHASES | BA | CA | CA | CB | CB | AB | AB | AC | AC | BC | BC | BA |
| | | | | | CURRENT SAMPLE | +B | -A | -A | +C | +C | -B | -B | +A | +A | -C | -C | +B |
| FORWARD LOW SPEED BRAKING  READ RIGHT TO LEFT ← | 1 | 0 | 1 | 0 | PHASES | BA | BA | CA | CA | CB | CB | AB | AB | AC | AC | BC | BC |
| | | | | | CURRENT SAMPLE | +B | +B | -A | -A | +C | +C | -B | -B | +A | +A | -C | -C |
| FORWARD HIGH SPEED BRAKING  READ RIGHT TO LEFT ← | 1 | 0 | 1 | 1 | PHASES | BA | BA | CA | CA | CB | CB | AB | AB | AC | AC | BC | BC |
| | | | | | CURRENT SAMPLE | -A | -A | +C | +C | -B | -B | +A | +A | -C | -C | +B | +B |

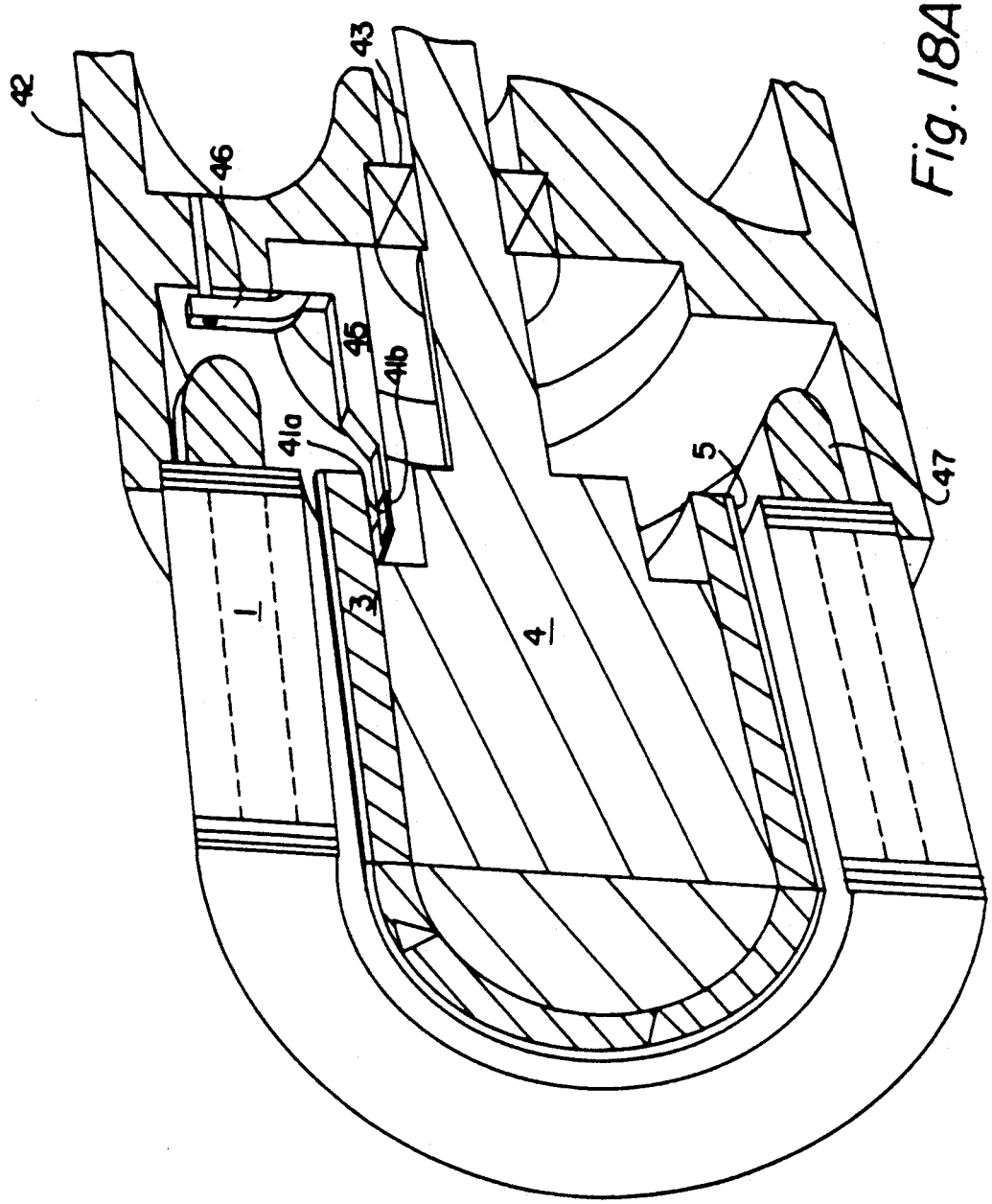

| COMMUTATION SEQUENCE |
|---|
| AB |
| AC |
| BC |
| BA |
| CA |
| CB |

| COMMUTATION SEQUENCE |
|---|
| A |
| -C |
| B |
| -A |
| C |
| -B |

OPERATING SEQUENCE

| STAR PHASES | MODE TRANSISTORS | | DELTA PHASES | MODE TRANSISTORS | |
|---|---|---|---|---|---|
| AB | 1 | 5 | A  | 1 | 8 |
| AC | 1 | 6 | -C | 7 | 6 |
| BC | 2 | 6 | B  | 2 | 8 |
| BA | 2 | 4 | -A | 7 | 4 |
| CA | 3 | 4 | C  | 3 | 8 |
| CB | 3 | 5 | -B | 7 | 5 |

ELECTRICAL DRIVE SYSTEMS

This is a divisional of co-pending application Ser. No. 755,786 filed Jul. 17, 1985 U.S. Pat. No. 4,782,272.

BACKGROUND OF THE INVENTION

1. Field of the Invention

This invention relates to electrical drive systems, especially DC drive systems. In particular it relates to brushless DC drive systems, including motors and amplifiers, of the type frequently referred to as trapezoidal drives. The invention also encompasses motors forming parts of such systems, and in addition provides certain features applicable not only to brushless DC drives but also to electric motors and drives of other kinds.

The brushless drives in question generally have an armature portion and a field structure portion, and in one form of construction, the field structure portion may be a permanent magnet rotor, having at least two poles, and the armature portion is a stator having windings which are energised in steps to advance the rotor poles and thus bring about rotation of the rotor. Particularly favoured constructions of motors of this type, often referred to as an "inside-out" construction, have six rotor poles and three phase windings.

2. Description of the Prior Art

Drives of this general kind are discussed in the papers "Electronically Commutated DC Feed Drives for Machine Tools" by P. Zimmermann, Motorcon September 1982 proceedings, "Ultra High Performance Brushless DC Drive" by A. C. Stone and M. G. Buckley, delivered at a conference in Brighton in October 1984, and "Novel Design and Control of Trapezoidal Back E.M.F. Motor—The Smooth Transition From Brush to Brushless DC" by A. C. Stone and M. G. Buckley, Motorcon April 1985. These papers contain extensive discussions of relevant background material in this field.

BRIEF SUMMARY OF THE INVENTION

It is an object of the invention to provide a DC drive system having a low speed performance adequate for servo use. In particular it is an object of the invention to minimise torque ripple in brushless drives and to provide smooth torque transitions. It is a further object of the invention to provide a machine structure favourable to the elimination of cogging or reluctance torque.

Yet further aspects of the invention have as their object the reduction of heat generation in control systems and motors for DC drives of the kind to which the invention relates, and the extension of the speed range of such drives.

According to a first aspect of the invention there is provided a direct current electric motor comprising a winding portion having a plurality of winding slots and a field portion having a plurality of poles, at least one of said portions being mounted for displacement relative to the other of said portions, the winding portion having at least one dummy slot between at least one pair of adjacent winding slots, and said at least one dummy slot being shaped so that during relative displacement of the winding and field portions, the reluctance forces prevailing between said portions due to the presence of said at least one dummy slot are substantially the same as the reluctance forces prevailing between said portions due to the presence of the winding slots.

In a rotational embodiment, the invention provides a direct current electric motor comprising an armature portion having a plurality of winding slots and a field structure portion having a plurality of poles, at least one of said portions being mounted for displacement relative to the other, the armature portion having at least one dummy slot between at least one pair of adjacent winding slots, and said at least one dummy slot being shaped so that during relative displacement of the armature portion and the field structure portion, the reluctance forces prevailing between said portions due to the presence of said at least one dummy slot are substantially the same as the reluctance forces prevailing between said portions due to the presence of the winding slots. Preferably said armature portion is a stator and said field structure portion is a rotor.

The stator may have at least one dummy slot between each two adjacent winding slots, and, in an especially favoured construction, it has two dummy slots between at least one pair of adjacent winding slots. Preferably the stator has two dummy slots between a pair of adjacent winding slots at a plurality of locations equally spaced around the stator. The winding and dummy slots may be spaced around the stator so that the angular spacing between any two adjacent slots is the same. In a multiphase brushless motor according to this aspect of the invention, the winding slots for each phase within an angular stator increment corresponding to an electrical cycle may be spaced so that the phases are equally spaced electrically within each electrical cycle. In particular, in a three-phase construction, the angular spacing between the winding slots of successive phases within each pole pitch may correspond to 120 degrees electrical.

In another aspect, the invention provides a brushless d.c. drive system, comprising a multiphase motor having a plurality of phase windings and control means for energising each phase winding of the motor in a predetermined sequence during system operation, said control means including means for regulating the current flowing in each motor phase during operation of the system in dependence on a current error signal established in the region of a transition between phases by comparison of a required current signal with the actual current present in the incoming phase so that the current error signal is, at least initially, of relatively large magnitude, due to the initial absence of energising current in the incoming phase, and thus demands a large phase current.

In a variant of this aspect of the invention, the invention may provide a brushless d.c. drive system, comprising a multiphase motor having a plurality of phase windings and control means for energising each phase winding of the motor in a predetermined sequence during system operation, said control means including means for regulating the current flowing in each motor phase during operation of the system in dependence on a current error signal established in the region of a transition between phases by comparison of a required current signal with the actual current present in the outgoing phase, so that the current error signal is of relatively small magnitude and initial phase current overshoot may be substantially minimised.

In a further control strategy applicable to braking regions of the four operating quadrants of a reversible drive, the drive system may have means for selecting, for predetermined regions of the torque/speed operating quadrants of the motor, said current error signal established by comparison of the required current signal with the actual current present in the incoming phase, and, for other regions of said operating quadrants, a current error signal established by comparison of the required current signal with the actual current present in the outgoing phase.

The invention also provides, in yet another aspect, a brushless d.c. drive system, comprising a multiphase rotational motor having a stator, a rotor, a plurality of phase windings, control means for energising each phase winding in a predetermined sequence during system operation, and sensor means associated with said control means for indicating rotor disposition at each of a plurality of rotational dispositions of the rotor relative to the stator, the control means being responsive to said sensor indication for a first rotor disposition for changeover between phases during rotation of the rotor through a phase transition in one direction of rotation and being responsive to said sensor indication for a second rotor disposition for changeover between the same phases during rotation of the rotor through the same phase transition in the opposite direction of rotation.

In a particular construction according to this aspect of the invention, said sensor means may include two switch means for each transition between phases and said sensor indications are provided by changes of state of the switch means, one of said two switch means undergoing a change of state when the rotor is in a first pre-determined rotational disposition relative to the stator for determining the changeover between the relevant phases for one direction of rotation through the transition and the other of said switch means undergoing a change of state when the rotor is in a second predetermined rotational disposition relative to the stator for determining the changeover between the same phases for the opposite direction of rotation.

In this variant of the invention, the shorter angular increment of rotation between the rotational disposition of the rotor for a change of state of one switch means and its rotational disposition for a change of state of said other switch means may define a phase transition region, the system then including inhibit means for preventing said control means from initiating changeover between phases on leaving a said phase transition region when the direction of rotation of the rotor is reversed while the rotational disposition of the rotor is within said phase transition region.

In a still further aspect, the invention provides a brushless d.c. motor, comprising a stator, a rotor having a plurality of poles defined by permanent field magnets, and a plurality of Hall effect devices positioned at a plurality of locations around a circumferential path, each of said devices being activated when there is a respective predetermined angular relationship between the rotor and the stator, and said Hall effect devices being disposed radially inwardly of axial end regions of said field magnets, so that said magnets serve also as triggering magnets for the Hall effect devices.

In a particular arrangement of this aspect of the invention, said field magnets are suitably mounted on a generally cylindrical rotor core and extend axially beyond one end of said core, so that the projecting ends of the field magnets overlie the Hall effect devices.

Yet another aspect of the invention provides a pulse width modulation power supply for a two-terminal inductive load, having at least two switches and control means for regulating the on and off periods of each switch to control current magnitude in said load, the on period of each switch being phase displaced relative to the on period of the other switch under zero net current conditions so that forward and reverse bias currents are established by respective overlap periods between the on periods of the switches.

A power supply according to this aspect of the invention, for a bidirectional load, has, suitably, four said switches, the on period of each of said switches being phase displaced relative to the on period of an associated one of said switches under zero net current conditions so that said bias currents are established by the respective overlap periods between the on periods of said switches.

In a power supply according to this aspect of the invention for a two-terminal bidirectional motor winding, the on period of each switch is phase displaced relative to the on period of an associated one of said switches so that forward and reverse currents are established by respective overlap periods between the on periods of said switches.

The invention may also provide, in a further variant, a pulse width modulation power supply for a three-phase motor having three phase windings, a six switch bridge, and control means for regulating the on and off periods of each switch to control current magnitude in each phase winding, each instantaneously active group of four switches together with the control means substantially instantaneously defining a power supply according the last-mentioned foregoing aspect of the invention.

In a penultimate aspect of the invention, there is provided a brushless d.c. drive system, comprising a three phase rotational motor and control means, said control means including means for connecting the phase windings of said motor in either star or delta configuration in dependence on a motor operating parameter, without interruption of motor rotation. Said motor parameter is suitably speed and the control means then includes means for monitoring motor speed.

In a final aspect the invention provides an electric motor comprising a stator having laminations, each stator lamination having at least one radially outwardly extending projection, and said at least one projection of each lamination along the axial length of the motor being circumferentially displaced about the axis of the motor relative to that of another of said laminations so that said projections define a series of circumferential fins for aiding heat dissipation from the stator. Each lamination suitably has two said projections and the projections of each lamination along the axial length of the motor substantially define two ribs extending in a spiral along said axial length.

The invention is especially applicable to "inside-out" brushless machines having six rotor poles and three phase windings in the 1 to 40 NM torque range, and in particular in the 6 to 16 NM torque range.

BRIEF DESCRIPTION OF THE DRAWINGS

Embodiments of the invention will now be described having regard to the accompanying drawings, in which FIG. 1 shows a cross-section of a prior art brushless DC motor.

FIG. 5 is a chart showing the phase energisation sequences and currents sampled for a conventional prior art drive system in accordance with FIG. 4, FIG. 6 shows in section a portion of a permanent magnet brushless DC motor having a stator provided with dummy slots.

FIG. 13 is a chart similar to that of FIG. 5 for a system in accordance with FIGS. 12A and 12B but disregarding certain features associated with phase transitions, FIG. 14 is an elaboration of the chart of FIG. 13 incorporating details of system operation during phase transition.

FIG. 17 is a further elaboration of the chart of FIG. 14, incorporating details of system operation under high speed braking conditions as set out in the diagram of FIG. 15, FIG. 18A is a pictorial representation of the locations of the Hall effect devices in said favoured disposition of FIG. 18;

DETAILED DESCRIPTION OF THE DRAWINGS

Figure 2:
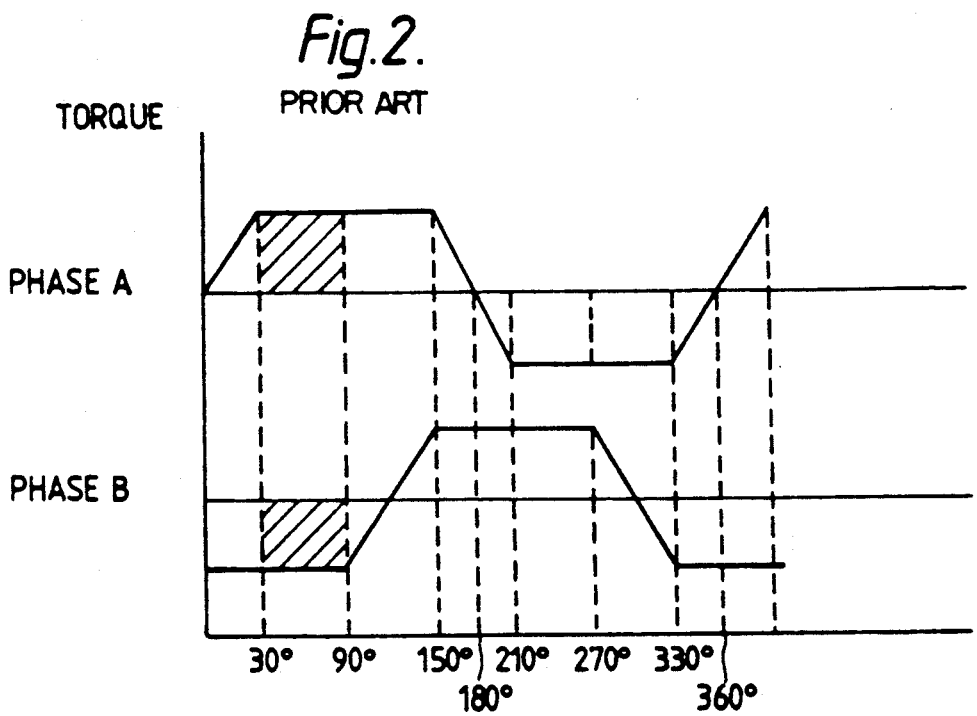
FIG. 2 shows the nature of the phase torque sensitivity in a prior art motor according to FIG. 1.

A prior art brushless DC motor is shown in FIG. 1. This has an "inside-out" or inverted construction, in which a stator 1 surrounds a rotor 52 and the windings are accommodated in a series of stator slots 2. The rotor of the machine is defined by a series of permanent magnets or poles 3 mounted on the external periphery of a rotor shaft or core 4 and held in position against radial displacement by a circumferential band 5. The construction shown has six magnets or rotor poles 3 and is a three phase star connected motor in which current flows in two of the three phases at all times. One of the two energised phases is switched off at each 60 electrical degrees and the third phase switched on. A sequence of six phase combinations thus results in which each phase is active for two consecutive working strokes i.e. 120 electrical degrees, twice per cycle. The torque sensitivity (or back E.M.F.) waveform of each phase is shaped so that constant torque is produced for constant current over the 120 electrical degree arc of movement. This idealised generation of 120 degree flat-top back E.M.F. per half cycle leads to the brushless DC configuration also being known as a trapezoidal type drive.

In order to achieve 120 degrees flat-top phase response, the poles 3 are defined by high coercivity rare earth-cobalt magnets, e.g. samarium-cobalt, positioned directly in the airgap and held on rotor 4 by the protective band 5. The samarium-cobalt magnets are used to achieve uniform field flux, to minimise armature reaction and inductance, and also to minimise rotor inertia. A concentrated coil arrangement is also used so that a square wave back E.M.F. is inherently generated by the system. FIG. 2 shows typical trapezoidal torque versus rotational displacement characteristics for the prior art motor of FIG. 1, in which the transition from one phase combination to another as the machine rotates may be clearly noted.

Figure 3:
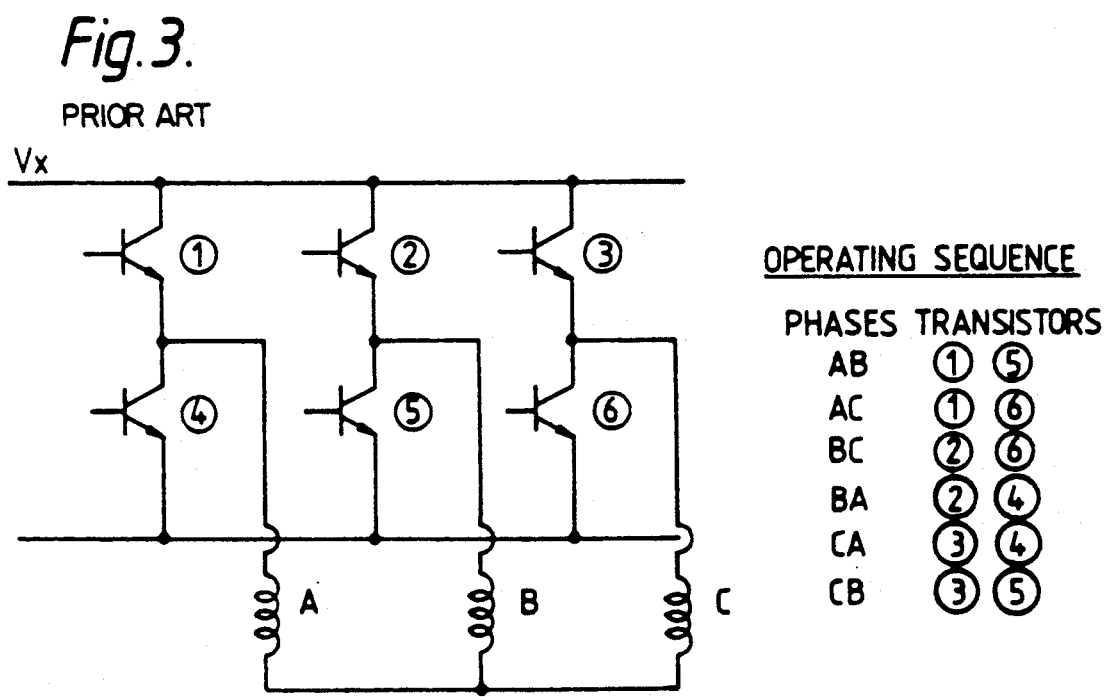
FIG. 3 shows an outline drive system or "transistor inverter" for the three phase prior art motor of FIG. 1.

As shown in FIG. 2, during the 60° increment from 30° to 90°, phases A and B are active. The direction of current flow through phase B is however reversed compared with that in phase A, as will be apparent from FIG. 3, to which reference is now also directed, so that the individual phase torques are additive and act in the same direction. Between 90° and 150°, phase B is deenergised and phase C becomes active, the current flow again being arrange for addition of phase torques. FIG. 3 is a schematic diagram showing the basic power feed system for the prior art motor of FIG. 1, together with the operating sequence of the various transistors designated by encircled reference numerals 1 through 6 energising the different phases A, B and C. It will be noted that the current flow through each phase in one direction during a first increment of each electrical cycle and in the opposite direction during a further increment of the cycle.

Figure 4:
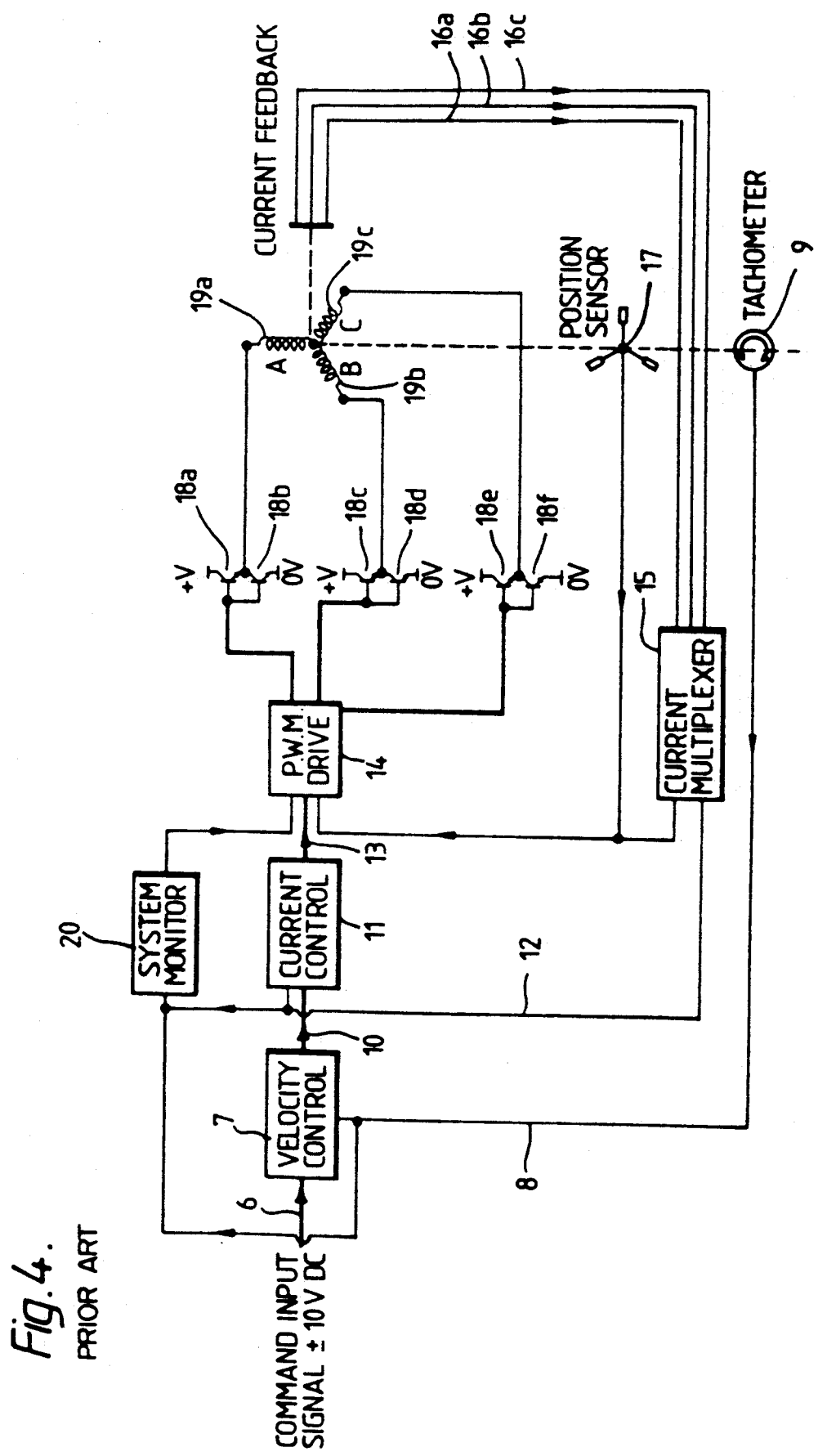
FIG. 4 is a schematic diagram of a control system for a prior art motor in accordance with FIG. 1.

FIG. 4 shows a schematic circuit diagram for an electronic control system for driving the prior art motor of FIG. 1. A high gain velocity loop is used in which an analog velocity command (±10 volts) (reference 6) is fed to the velocity loop incorporating controller 7 from a differential input amplifier (not shown). This is compared with the actual motor velocity feedback signal (reference 8), e.g. a voltage proportional to motor rotational speed, monitored by a tachometer 9 or any other suitable sensor means, to produce a velocity error (reference 10), which is fed to a current loop incorporating controller 11. The current loop 11 compares the velocity error 10 (which represents a current command) with the actual motor current feedback signal (reference 12), e.g. a voltage proportional to current, to produce a current error signal (reference 13). This current error signal 13 is fed to a pulse width modulation (PWM) stage 14 of the control system. A single current loop is used, this being achieved by multiplexing (at 15) the three current feedback signals (16a, 16b, 16c) (one for each phase) into a single loop (input 12 to current controller 11). Selection of the correct phase current 16a, 16b or 16c to be fed into the loop is controlled by commutation information stored in read only memory (ROM). This memory contains electronic commutation information addressed by rotor position information provided by a position sensor 17, the PWM lines, and a rotor direction of rotation signal. Outputs from read only memory also provide drive signals for transistors 18a, b, c, d, e, f in the power stage, together with some control signals and status information, to feed the windings 19a, b, c. System monitor 20 includes various protective features necessary for the practical functioning of the system but not to the understanding of its principles of operation.

FIG. 5 is a tabular chart illustrating in more detail the operation of a prior art system such as that of FIG. 4 and may also be compared with FIG. 3. In the simple conventional mode of operation shown, the desired direction of rotation is indicated by the input 6 of FIG. 4 being positive or negative and rotor position is indicated by three Hall switches (A, B and C), which between them define eight possible codes, two of which are illegal, the other six being used for position information. For each segment of rotor rotation identified by a Hall code, two phases are active, as indicated for both reverse and forward modes, and the current in one of these phases is used to provide feedback, as identified by the current sample or feedback row shown in the table. Since each phase is active over a 120° electrical period, the same phase can be used as the current sample for two successive 60° Hall increments, and the phase selected for each 120° increment is that which enables current sensing to relate to current flowing in the same direction in each 120° increment. This conventional arrangement requires a minimum of information from position and speed sensors of the system.

The motor described in relation to and shown in FIG. 1 is a six-pole machine with a three phase winding. The direct one slot per phase per pole winding arrangement shown results in a total of 18 lamination slots, which is particularly unhappy number from the point of view of cogging or reluctance torque. In order to obviate this, an arrangement such as that shown in FIGS. 6–8 may be used. In this construction, each portion or tooth 21 of the stator lamination lying between a pair of the winding slots 2 is provided with a dummy slot 22. Each dummy slot 22 is essentially a notch in the radially inner face of the lamination tooth 21 and is dimensioned to behave similarly to a winding slot opening 23 from the reluctance torque viewpoint. Basically this means that the notch is the same width as the winding slot and is of a depth which is large compared with the airgap. Thus a basic 18 slot lamination may be converted into what is effectively a 36 slot lamination by providing one dummy slot in each tooth face. The only change at the winding terminals is that the ripple due to slot effects is at twice the frequency which would apply to the 18 slot lamination. Thus the rotor "sees" 36 slots from the point of view of reluctance torque.

The reluctance forces prevailing between the rotor and stator as a result of the presence of the dummy slots are of the same order of magnitude as those due to the winding slots proper. These forces vary as the magnets of poles 3 pass by the slots so that the frequency of cogging is increased. This increase, representing a doubling of the frequency in the case of 36 slots in an 18 winding slot lamination, allows the elimination of cogging torque to be achieved with a lesser degree of, for example, skew or short-pitching, than would be the case in the absence of the dummy slots.

Both of these cogging reduction techniques decrease the extent of the flat top flux linkage from its idealised 180° electrical angular extent, and therefore also shorten in angular terms the idealised flat-top portion of the torque waveform, so that excessive torque ripple may then be experienced at phase transitions. A further disadvantage of rotor phase skewing as a cogging reduction technique is that it may result in constructional difficulties and possible problems in magnetising the permanent magnets of the rotor in the production process.

However, the higher frequency of cogging achieved by providing the dummy slots in accordance with the present invention permits the necessary reluctance torque reduction to be achieved with lesser interference with the flux linkage waveforms than would apply in the absence of these dummy slots as well as enabling other difficulties associated with cogging reduction to be substantially minimised. Thus, in summary the dummy slot is important in allowing ripple reduction techniques to be used with much less effect on the basic torque or speed voltage output. Because there are now twice as many slots from the reluctance viewpoint, the required skew or short-pitch is reduced by half. A similar construction may be employed on a motor armature, as an alternative to or in addition to pole skewing, and this method of minimising or substantially eliminating cogging torque is not necessarily limited to brushless DC drives.

A combination of 18 winding slots and 19 dummy slots may be used to give a particularly favourable condition of low cogging. By providing 37 equally spaced teeth around the inner periphery of the stator, the reluctance torque at each point will tend to cancel with that at a point diametrically opposite. Seventeen of the flux carrying teeth each contain a single dummy slot cut in the centre of the tooth face while the eighteenth tooth is one and one half times as wide as the others and contains 2 equally spaced dummy slots. All the openings, both for the windings and the dummy slots, are equally spaced around the circumference. The resultant short-pitching effect on the winding reduces the extent of flat-top flux linkage per phase by about 30 electrical degrees, which is marginally acceptable in a six-step or trapezoidal design.

The reduction in flat-top is occasioned by each coil of each 6-coil phase winding being short-pitched. The slot spacing is uniform at 9.73° mechanical between adjacent slots of whatever kind, and the overall loss of flat-top in electrical degrees is thus 3 times this figures, i.e. 29.19° electrical, in precise terms, since the total torque contribution delivered by each phase winding, when active, consists of a summation of the contributions of each of its six individual coils. It will be apparent that the torque-generating action of each successive coil of the 6 coils of the phase winding is phase displaced electrically relative to that of the preceding coil due to the presence of the extra or 37th dummy slot, this extra slot bringing about a progressive relative mechanical displacement of these coils from the positions which they would occupy in a 36-slot construction.

Figure 7:
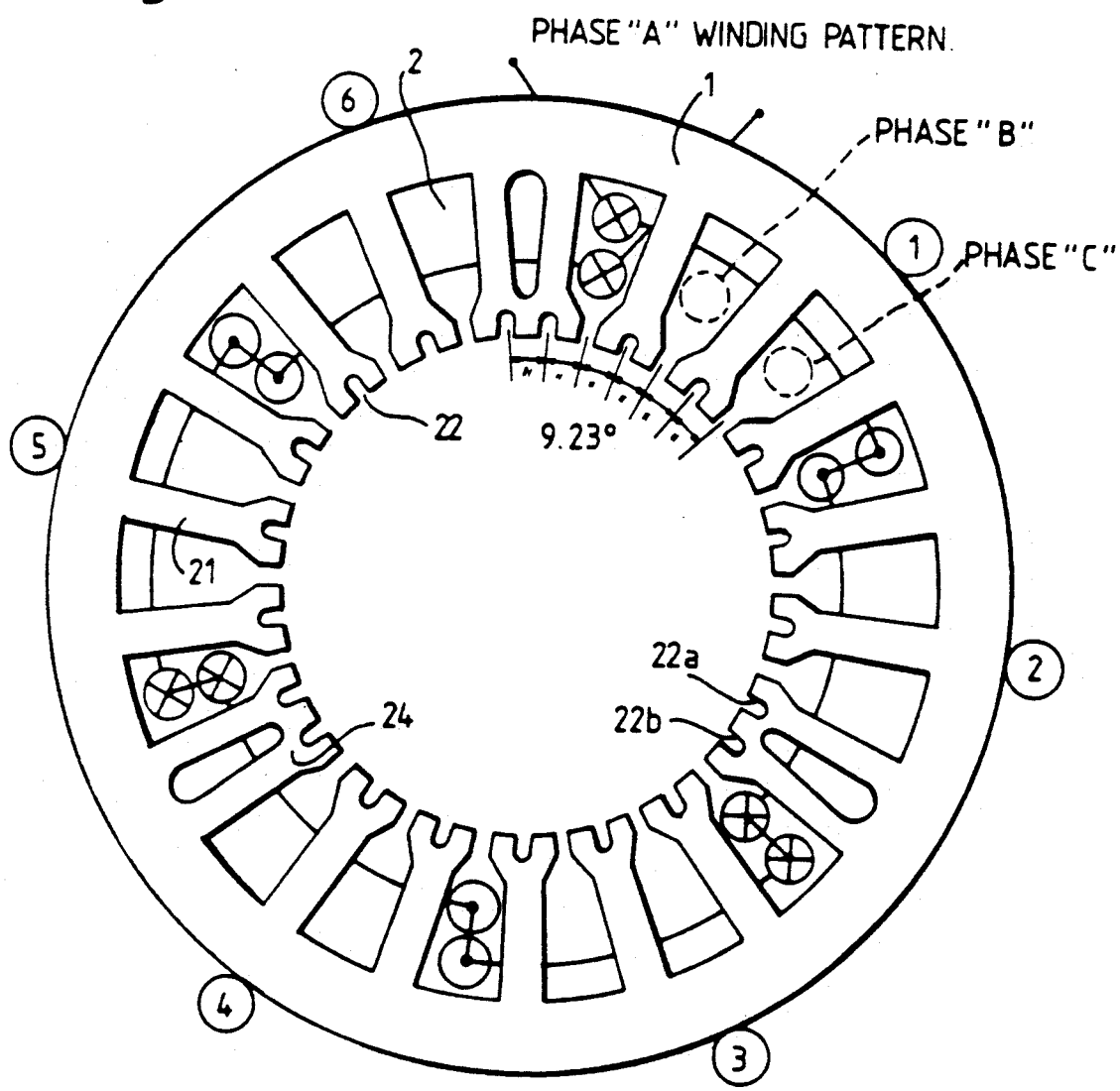
FIG. 7 shows a stator lamination for a brushless DC motor embodying principles of the present invention, the lamination being provided with dummy slots.

FIG. 7 shows an alternative lamination having 39 slots. In this arrangement, at least one dummy slot 22 is provided between each adjacent pair of winding slots 2, the dimensions of these dummy slots in terms of circumferential gap being the same as those of the winding slots, so that the samarium-cobalt magnets of the rotor again "see" the dummy slots as though they were real or winding slots. The enhancement in the number of slots increases the frequency of cogging torque, doubling the number of slots doubling the cogging frequency, and also in itself slightly reduces the amplitude of the cogging torque. However, the impact of introducing dummy slots may be further improved by the addition of one or more extra dummy slots, for the purpose of reducing the amplitude of the cogging torque, so that at one or more locations around the inner periphery of the stator lamination, two dummy slots 22a, 22b are provided between a pair of adjacent winding slots. As shown in FIG. 7, two dummy slots are provided at three locations around the inner periphery of the stator lamination, as defined by its teeth, in circumferentially enlarged at least three stator lamination teeth 24, so that there is a total of 39 slots as perceived by the rotor, while the number of winding slots remains at 18.

In the arrangement of FIG. 7, all of the slots are equally spaced around the internal periphery of the stator lamination. Since there are 39 of them over the 360 degree periphery of the stator, their angular spacing is thus 9.23 degrees mechanical. Accordingly the first, third and fifth of the six coils of the phase winding, identified around the external periphery of lamination 1 in FIG. 7 by the encircled reference numerals 1 through 6, which each span six slots, are short pitched, at 55.38 degrees mechanical, while the second, fourth and sixth coils, which span 7 slots, are long pitched, at 64.61 degrees mechanical. Thus the rotor pole peripheries do not exactly match the spacing of the winding coils, this resulting in the elimination of the cogging torque. The degree of short pitch or long pitch in each case equals 4.62° mechanical, so that the overall loss of flat-top is 14.85° electrical, i.e. three times the mechanical short or long pitch. In this construction, there is mechanical symmetry as between the first and second coils taken together, and the corresponding coil pairs defined by the third and fourth coils and the fifth and sixth coils, respectively, of each phase winding. Thus the short and long pitch effect results in the loss of flat-top taking place as between the two individual coils of each coil pair defined by the first and second coils, the third and fourth coils, and the fifth and sixth coils, respectively, whereas the net torques developed by each coil pair defined by the first and second coils, the third and fourth coils, and the fifth and sixth coils, taken as a pair, coincide. Accordingly, the torque contribution of the first coil is phase displaced relative to that of the second coil, as is that of the third coil relative to the fourth coil, and the fifth coil relative to the sixth coil, but the contributions of the first, third and fifth coils and the second, fourth and sixth coils are electrically in phase relative to one another. The end result is a reduction in loss of flat-top compared with the arrangement having 37 slots consisting of 18 winding slots and 19 dummy slots, previously described hereinbefore.

However, the arrangement shown in FIG. 7 has the side effect of upsetting to a small degree the electrical symmetry of the construction and the 120 degree electrical spacing between the phases is altered. Thus the overlap between torque waveforms is different for different phase transitions. Referring again to FIG. 7, it will be apparent that phase B is 18.5° mechanical from phase A, while phase C is 37° mechanical from phase A. Thus the respective shortfalls in angular phase spacing as compared with the ideal of 20° and 40° mechanical respectively are 1.5° and 3° mechanical respectively. This phase displacement also has the effect of reducing slightly the extent of flat-top, in that the additive contributions of the phases do not coincide in precise accordance with the idealised representation of FIG. 2.

Figure 8:
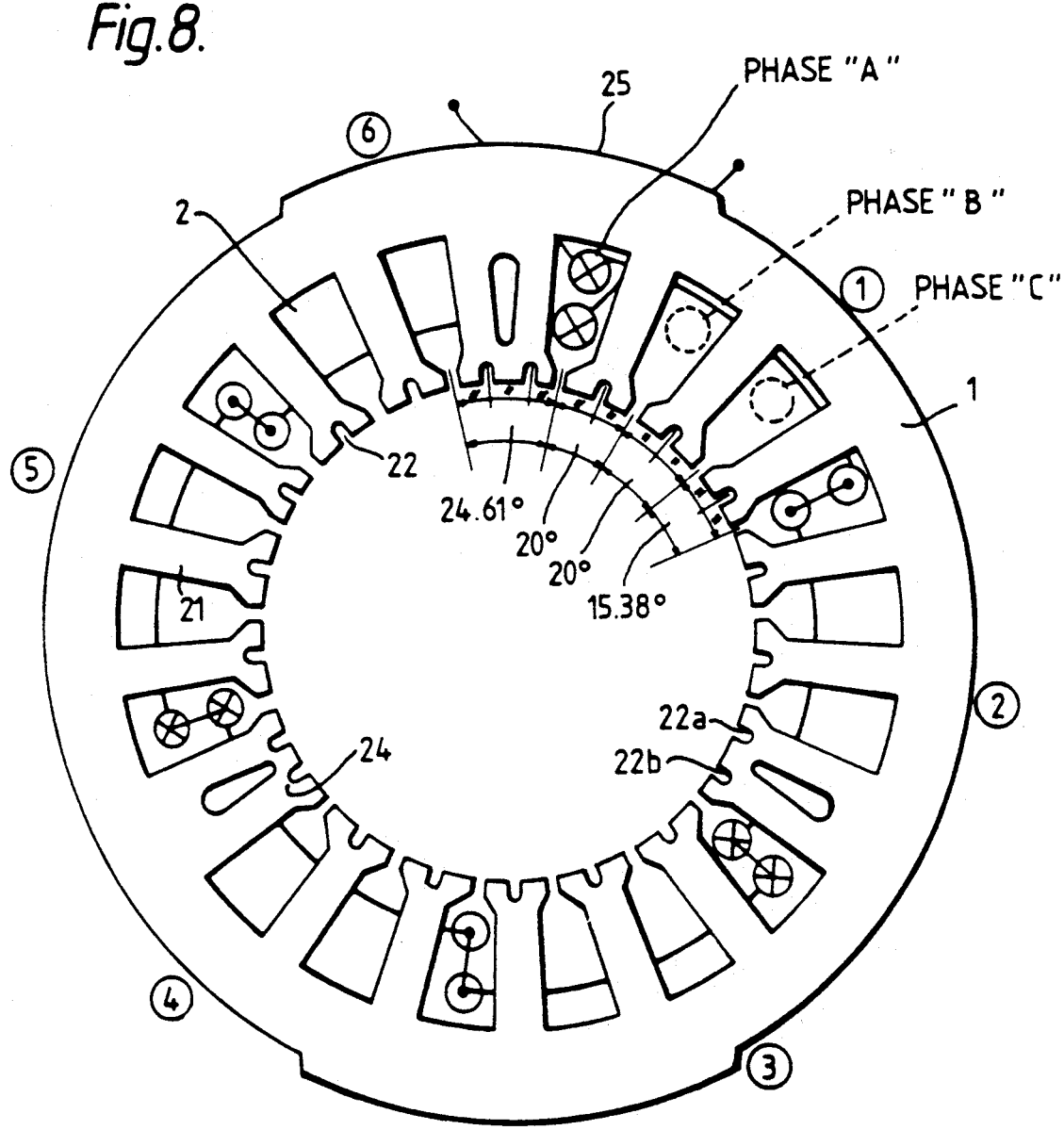
FIG. 8 shows an alternative configuration of stator lamination provided with dummy slots.

In order to overcome this problem, the construction shown in FIG. 8 may be adopted, in which all of the phase B slots and all of the phase C slots are rotated relative to the phase A slots so that there is a full 20 degree mechanical spacing between each phase B slot and its preceding phase A slot and also between each phase C slot and its preceding phase B slot. The spacing between a phase C slot and the following phase A slot across the two dummy slots 22a, 22b in each circumferentially enlarged stator tooth 24 is 24.61 degrees while the spacing across the single dummy slot at each other transition between phases C and A is 15.38 degrees. The first, third and fourth of the 6 coils of the phase winding, identified around the external periphery of the lamination 1 in FIG. 8 by the encircled reference numerals 1 through 6, accordingly remain short pitched, as in FIG. 7, again spanning 55.38 degrees, while the second, fourth, and sixth are long pitched, at 64.61 degrees. However the mechanical spacing between phase A and phase B is exactly 20°, as is that between phase B and phase C, this corresponding to 120 degrees electrical in the motor construction shown. Each 120 degree section of the lamination shown in FIG. 8 is symmetrical, and has four types of tooth. Thus the loss of flat-top occasioned by the departure from 120° electrical phase displacement in the construction of FIG. 7 is removed and uniformity of the phase-to-phase transitions ensured. The reduction in cogging torque achieved by the dummy slots and the short pitching results in loss of flat-top remaining, however, substantially in line with that of the arrangement of FIG. 7, this thus representing a substantial minimum for such reduction.

Lamination 1 of FIG. 8 also has a fin or projection 25, to be described in more detail in connection with other subsequent drawings.

The precise shaping of the teeth which define the winding and dummy slots is not of critical importance, but as set out above, the spacing of the slots is relevant to the elimination or reduction of cogging torque and slot ripple effects, while retaining the trapezoidal shape of the torque wave forms. In yet another construction of stator lamination having dummy slots, 27 slots in total are used, every second tooth having a dummy slot. Still further constructions of lamination embodying suitable arrangements of dummy slots may be devised as required by particular operating needs.

Figure 9A:
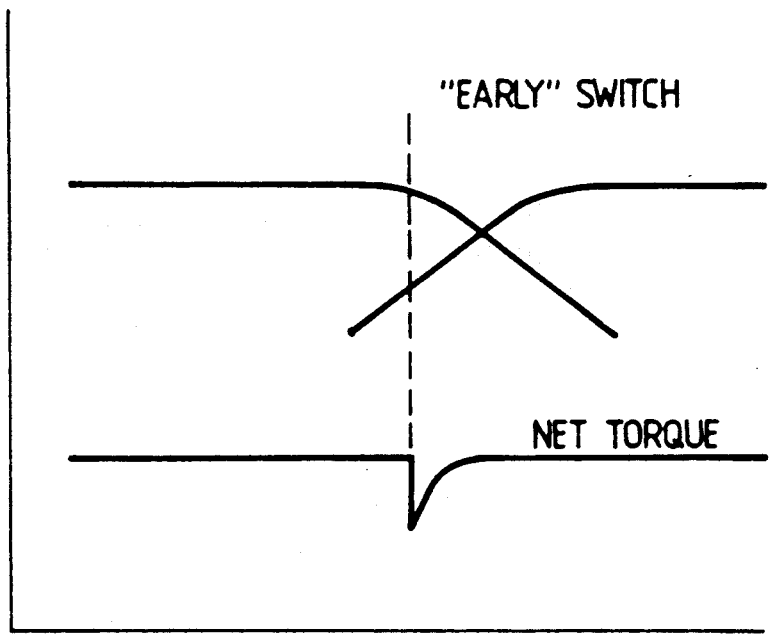
FIG. 9A shows the nature of the torque variation in the transition region with early and switching.
Figure 9B:
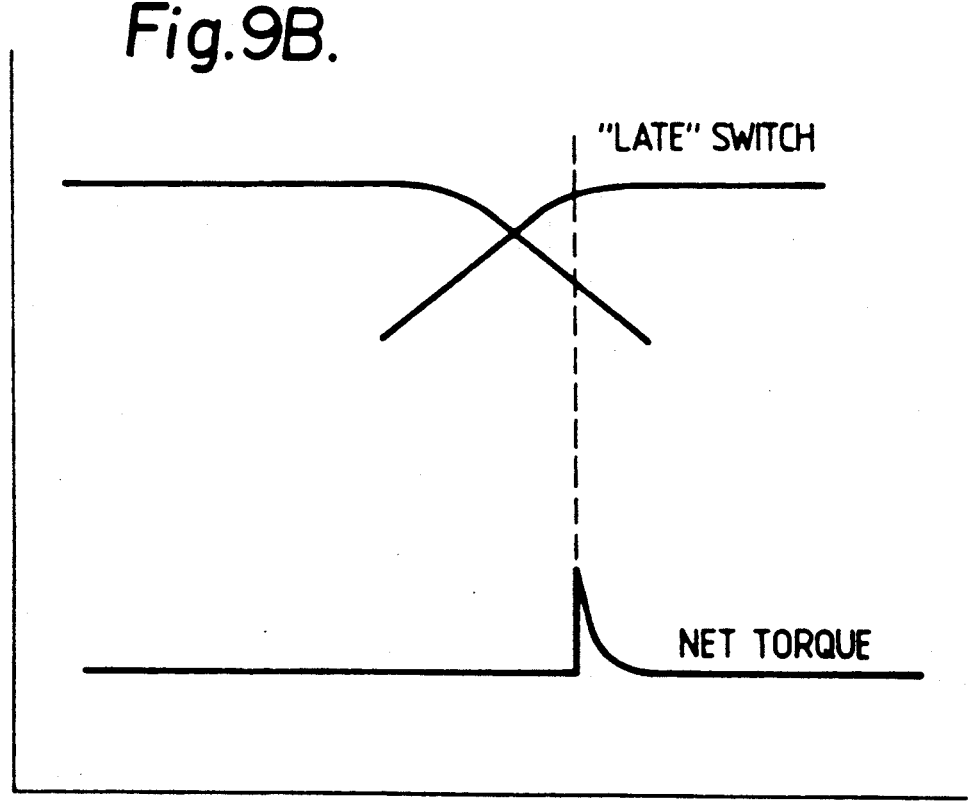
FIG. 9B shows the nature of the torque variation in the transition region with late switching.

Reverting to the control system illustrated in FIG. 4, it will be seen that it requires only the positions of the phase transition points to be detected by the position feedback device. At these points it is theoretically desirable to have an instantaneous transition from one phase combination to the next at the point of equal torques, i.e. where the two phase torques are equal. In practice the current rise time on the phase winding is limited by the DC bus voltage and the motor phase inductance. Also, the practical tolerances in volume manufacture mean that it is not readily possible to arrange three sensors precisely coincident with six phase transition points. Even if this were possible, the effects associated with such an arrangement are not necessarily wholly desirable. Under the slow speed conditions required by servo performance, and also under conditions of heavy load, a reduction in torque at the phase transition may result in stalling, or oscillation at the point of equal torque. The reduction in net torque caused by early switching, i.e. before the torque crossover or equal torque point, is shown by FIG. 9A. If the outgoing phase is switched off too soon, the incoming current is unable to provide enough torque to maintain a uniform torque level throughout the transition. Thus, to overcome such effects, it is necessary to provide a switch point which will preclude stalling and also to build in some hysteresis at the switch point. In this way, a clean and abrupt transition from one torque waveform to the next may be achieved. This ensures that the motor tends to come smoothly through the phase transition and minimises torque ripple. Thus, according to the present invention, phase commutation is implemented after the point of equal torque, i.e. "late switching" is used. This has been found to minimise disturbances in velocity through the commutation points and is illustrated in FIG. 9B. This technique of late switching also results in an increased torque at the commutation point for a brief period (the torque "spike" indicated in the Figure) and eliminates any tendency for the motor to stall. Tolerances may also be taken up in the region immediately surrounding the point of equal torque. In order to provide the necessary position signal on each side of the switch point, a Hall effect switch is positioned to each side of the transition point as indicated schematically in FIGS. 10 and 10A by the encircled reference numerals 1 and 2, the phase combination to the lefthand side, in FIG. 10, of the transition being designated AB and that to the right of the transition being identified as AC.

The late switching feature also has a further advantageous effect, in connection with which FIG. 10 is again relevant, in that oscillation about the switch point is avoided by the phase energisation configuration of the machine remaining in the combination in which it entered the transition region until such time as it passes the switch on the side from which it emerges from the transition region during a movement without reversal through the transition. Thus oscillation between phases is prevented, and in FIG. 10, moving from left to right, the AB phase combination is maintained until Hall 2 is triggered, whereas when moving from right to left, the AC combination is preserved until Hall 1 is reached. Thus there is late switching in both directions during movement through a transition and there is no oscillation within the transition region.

In addition, a further information bit is provided in the control system to prevent phase change on reversal of the direction of rotation within the transition region, i.e. between Hall 1 and Hall 2, especially at slow speed. By the detection of tachometer polarity and the provision of a suitable address bit, clockwise or anticlockwise rotation is detected and the controller may be made aware of the direction from which the rotor is approaching the switch point so that an appropriate direction input may be provided to the controller. A latch on the direction input renders it inoperative insofar as activating the phase change is concerned if reversal takes place in the transition region between Halls 1 and 2. Thus if the motor is reversed after passing Hall 1 in the AB configuration but before reaching Hall 2, no phase change takes place and it moves back along the AB characteristic.

Figure 11:
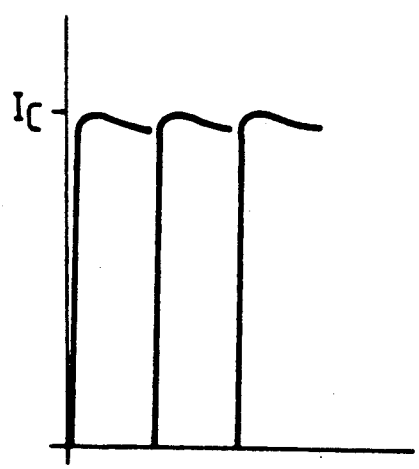
FIG. 11 shows the succession of rising currents experienced by successively energised phases.

The current flowing in each phase in the motor of FIG. 4 is sensed by an electrically isolated sampling circuit. However since only two phases are active at any one time, only the current in one phase requires to be controlled. This in turn necessitates only the one current loop. The three phase currents are thus applied to multiplexer 15, which selects the appropriate phase current, depending on the rotor position and direction, in accordance with instructions stored in a PROM. It will be apparent that for any phase combination there is in theory a choice as to which phase current may be monitored in order to obtain the current feedback, and in general it is immaterial which of the two currents available at any given time is used, except in the transition regions between phases. In the operating modes set out in the chart of FIG. 5 for the system of FIG. 4, the straightforward and conventional option is adopted of selecting the same phase current for feedback purposes over each 120° electrical segment of the electrical cycle and disregarding the transition regions entirely. If the commutation situation shown in FIG. 9 is again considered, under conditions of constant current, the current rise time in the winding will in practice be found to be limited by the DC bus voltage and the motor inductance. However if a fast current loop is used, the response of the current at the phase transition may be optimised to achieve no overshoot and no ringing. If current monitoring is transferred from phase A to phase C at this point, rather than, as in the chart of FIG. 5, maintained on phase A, the current loop instantaneously sees a zero current condition in phase C and a constant current command. In response to this there is a large current error and the complete bus voltage is applied across the phase combination. This results in a rapid rise of current in this phase. The arrangement also gives the motor current a characteristic shape, illustrated in FIG. 11, consisting of rising edges of current at each transition. Under low speed conditions, the controlled current rise time will match the rate of decay of current in the phase. Thus any torque disturbance to be possibly expected as a result of non-instantaneous current rise may be avoided.

An advantageous construction of control system for a drive in accordance with the invention will now be described having regard to FIGS. 12A, 12B, and 13 through 17. The system of FIGS. 12A and 12B has similarities of configuration to that of FIG. 4 and corresponding features are identified by the references already used in FIG. 4. A command input signal 6 sets a desired operating condition for velocity loop 7, which is compared against actual velocity 8. The velocity error 10 provides the input to current loop 11, with 12 representing the actual current input to this loop. The current error signal drives PWM generator 14. Multiplexer 15 serves to select the appropriate current 16a, b, or c for feedback 12 into the current loop. Position sensors (six in number) provide inputs 26 for use in PROM 27 for phase control of the base drives and these inputs are also applied to the PROM of multiplexer 15.

Figure 12A:
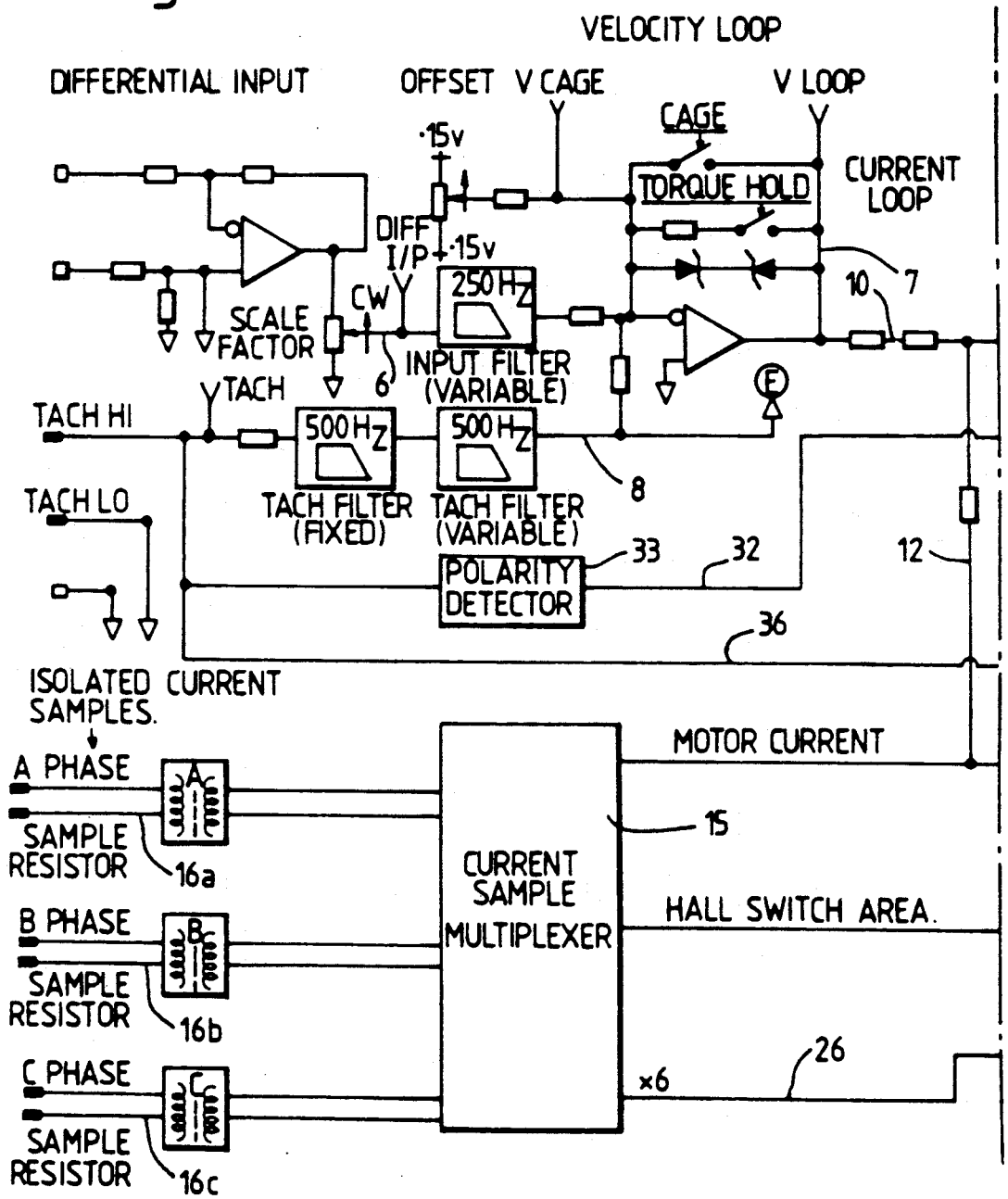
FIG. 12A is a first portion of a schematic block diagram of a control system for a motor, the system embodying features of the present invention.
Figure 12B:
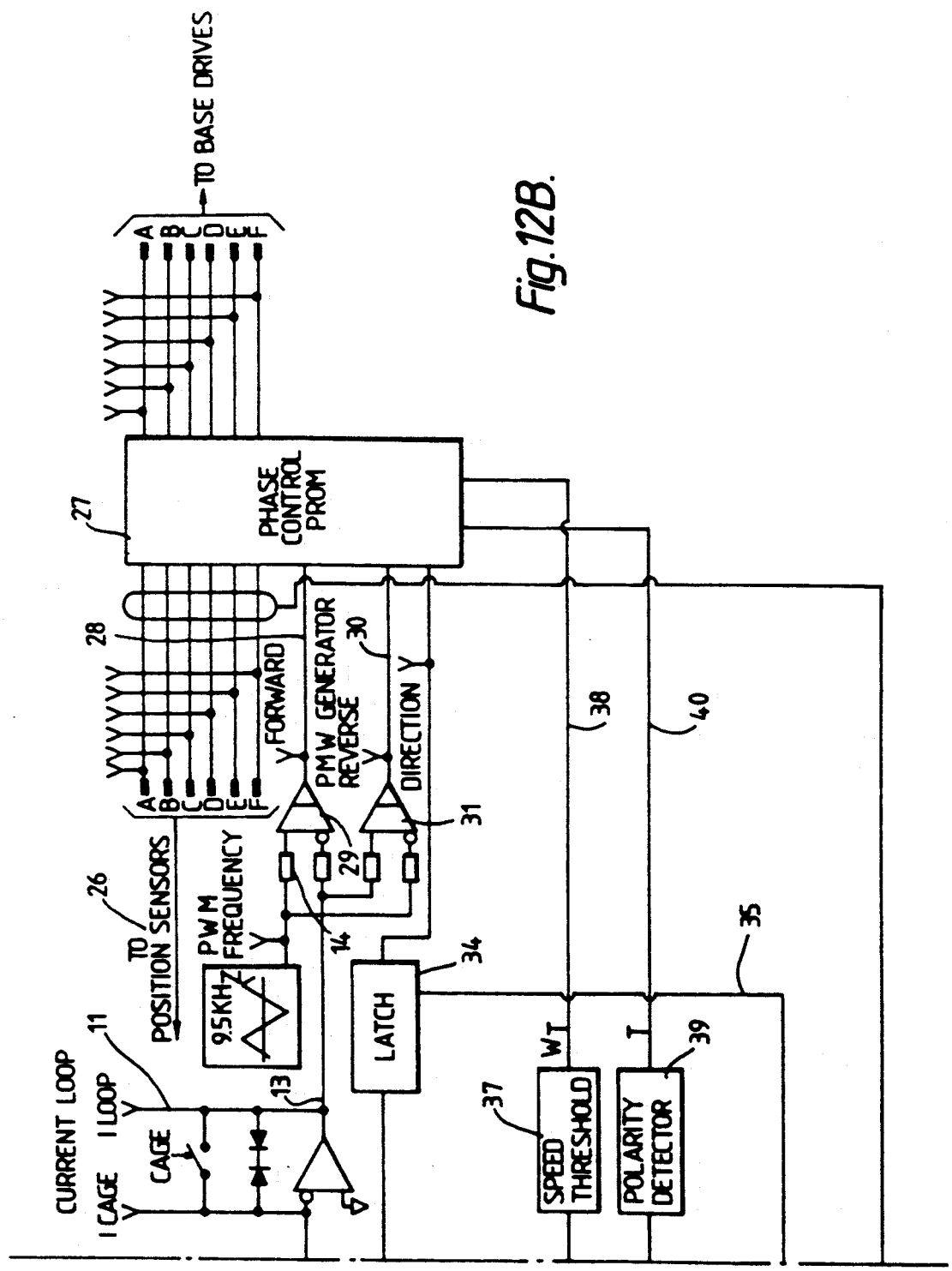
FIG. 12B is a further portion of the schematic block diagram of the motor control system, the first portion of which is shown in FIG. 12A, FIG. 12B being a continuation of FIG. 12A.

In contrast with the conventional system of FIG. 5, where the direction of desired rotation resulted in one or other of the phase sequences being energised, the PWM mode of FIGS. 12A and 12B results in both forward and reverse currents being generated so that a bias is established to hold the motor against rotation under standstill conditions. The actual current level is set by the current loop while the generator 14 establishes the PWM pulse width. The output of generator 14 provides inputs to PROM 27, which selects the individual phases to be driven in dependence on rotor position.

The chart of FIG. 13 sets out similar manner to that of FIG. 5 the various inputs to PROM 27, disregarding certain elaborations of the system to be subsequently explained. The chart also relates to simple transitions using only three Hall switches. It will be seen that the four possible modes of operation are determined by the three bits of information defined by PWM Forward, PWM Reverse and Direction. These are represented respectively on FIGS. 12A and 12B by input 28 from the forward amplifier 29 of PWM generator 14, input 30 from reverse amplifier 31, and input 32 from polarity detector 33. Input 32 provides a signal indicative of the actual direction of rotation of the rotor. Only four of the possible combinations of these 0 to 1 on/off type inputs are used for phase control and the remainder represent either illegal conditions indicative of a logic error, or a PWM off condition.

PROM 27 is programmed to recognise the appropriate inputs and, in conjunction with these and the further inputs 26 from the Hall switches, to establish the appropriate phase combinations in the sequences set out in the chart. The phase combination sequence for reverse operation is read from left to right and that for forward operation from right to left, but each individual combination within a sequence is read from left to right. The chart also shows the phase current to be used as the sample for current feedback to provide the rising edge incoming phase arrangement of FIGS. 10 and 11. The Hall information 26 provides a further input to a PROM of multiplexer 15 for this purpose. The plus or minus sign against each current sample relates to the need to take account of the direction of the energising current in the phase, since it reverses between each combination in which each individual phase is involved in the course of a single electrical cycle, and each input 16a, 16b or 16c to multiplexer 10 is thus duplicated, so that the current signal can be read in the sense appropriate for maintaining rotor rotation in the desired direction. If the current signal were to be considered with regard to magnitude only and ignoring direction, those signals denoted as negative would be interpreted as rotation in the "wrong" or undesired direction.

Figure 10:
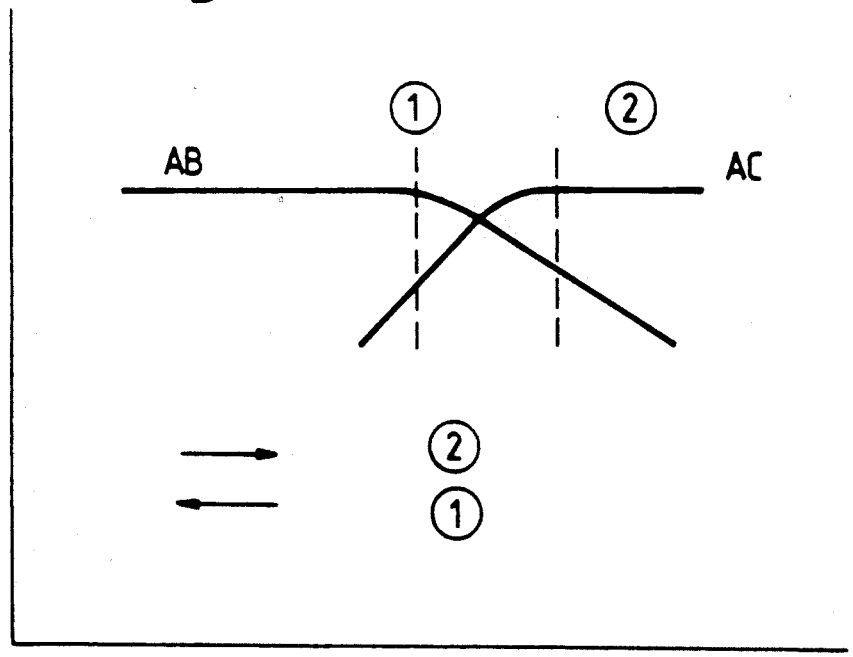
FIG. 10 shows the disposition of position sensors in relation to phase torque transition.
Figure 10A:
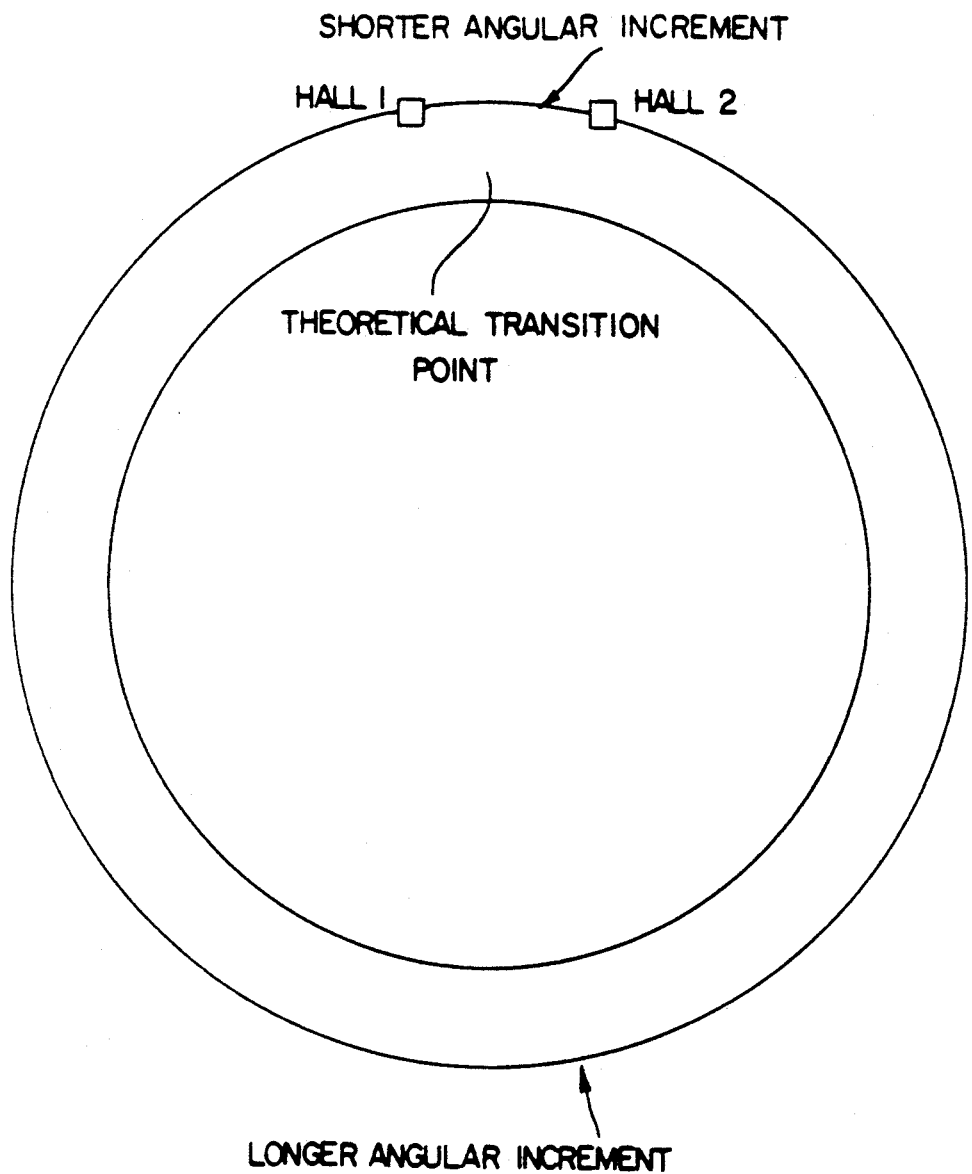
FIG. 10A is a diagram showing the angular increments between Hall switches at a phase torque transition.

The chart of FIG. 14 represents an elaboration of that of FIG. 13 in which six Hall (A, B, C, D, E and F) switches are provided and transition regions can thus be identified. The transitions are indicated in FIG. 14 by the cross-over points in the outline phase torque diagram shown under the Hall codes at the top of the chart. Inhibiting of phase change on reversal within the transition region, as noted in regard to FIG. 10, is achieved by latch 34 of FIGS. 12A and 12B, which interrupts inputs 32 in the presence of an input 35 from multiplexer 15 indicative of the rotor disposition corresponding to a transition region. Triggering of latch 34 by signal 35 disables input 32 to PROM 27 and prevents phase change in a transition region, so that if reversal takes place in this region, the phase combination prevailing on entry to the transition region is maintained. Outside the transition region, Hall switch area input 35 allows the polarity or direction signal 32 unimpeded access to PROM 27. It will be noted on the chart then in each transition region the settings of the two Hall groups ABC and DEF are different, while in the non-transition regions they are the same.

Figure 15:
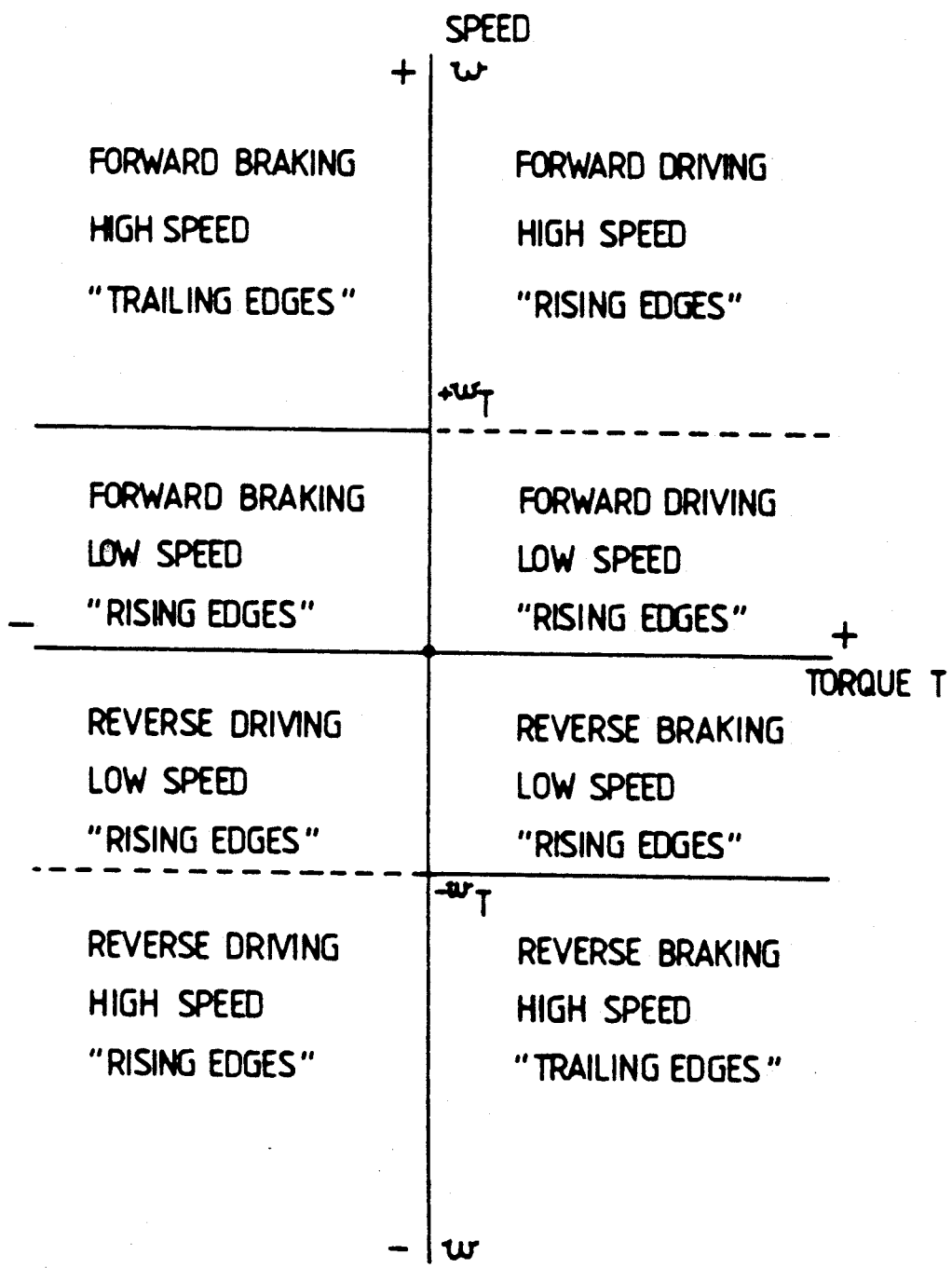
FIG. 15 is a diagram showing current selection regions in four quadrant operation.

In regard to still further elaborations of the system of FIGS. 12A and 12B. FIG. 15 shows eight operating regions relevant to a motor according to the invention, in terms of speed and torque. In the forward and reverse braking quadrants, at higher speeds, current monitoring base don rising edges, i.e. the incoming phase, may result in current overshoot, and in order to obviate this, in the higher speed regions of these quadrants, current feedback may be based on the trailing edges or outgoing phases of each phase combination.

Figure 16:
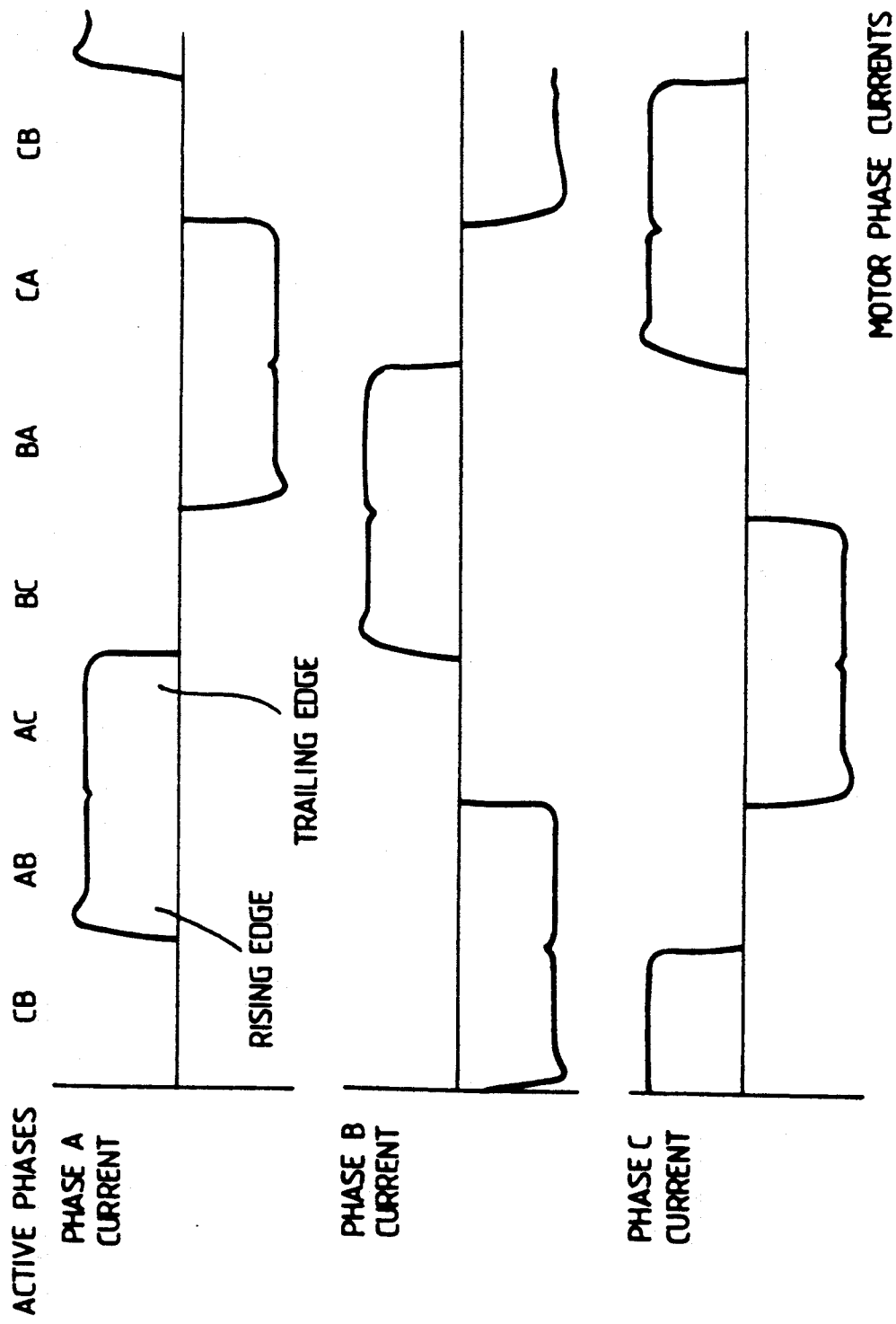
FIG. 16 shows the leading and trailing edge regions of three phase currents in a motor control system in accordance with FIGS. 12A and 12B.

The rising and trailing edges of the three current waveforms are shown in FIG. 16. With rising edge current feedback, for a particular operating mode, current is monitored in the sequence $-B, +A, -C, +B, -A, +C$, whereas in the case of trailing edge monitoring, the sequence is $+C, -B, +A, -C, +B, -A$. The monitoring sequences are held in the PROM of multiplexer 15 and the appropriate sequence selected in dependence on machine speed, direction of torque (i.e. whether the current is positive or negative) and direction of rotation. These three bits of information establish uniquely which of the eight operating regions of FIG. 15 is present.

Machine speed as measured by a sensor such as a tachometer provides an input 36 to a threshold means 37, which, when the speed exceeds a preset value, applies an input 38 ($W_t$) to PROM 27. A polarity detector 39 determines the torque direction from the motor current signal 12, i.e. whether the current is positive or negative, and provides an input 40 (T) to PROM 27. The current direction indicative of torque is related to the direction of motor drive and is not related to the signing of the sample current, which is a convention adopted in the charts and is distinct from torque.

In the presence of suitable combinations of inputs, as set out in full in the final chart, FIG. 17, current feedback is transferred from the rising edges or incoming phases to the trailing edges or outgoing phases, when the motor operating mode is in the high speed braking regions of the quadrants of FIG. 15. The chart of FIG. 17 incorporates all the features of that of FIG. 14 along with the additional columns necessitated by inputs $W_t$ and T (38 and 40) while the altered current sampling criteria in the high speed braking regions will be apparent in the appropriate rows.

The diagram of FIG. 15 may be referred to as representing "eight-quadrant" operation. Hysteresis is built into the $W_t$ criterion so that the up-change critical speed is different from that relating to a down-change.

Figure 18:
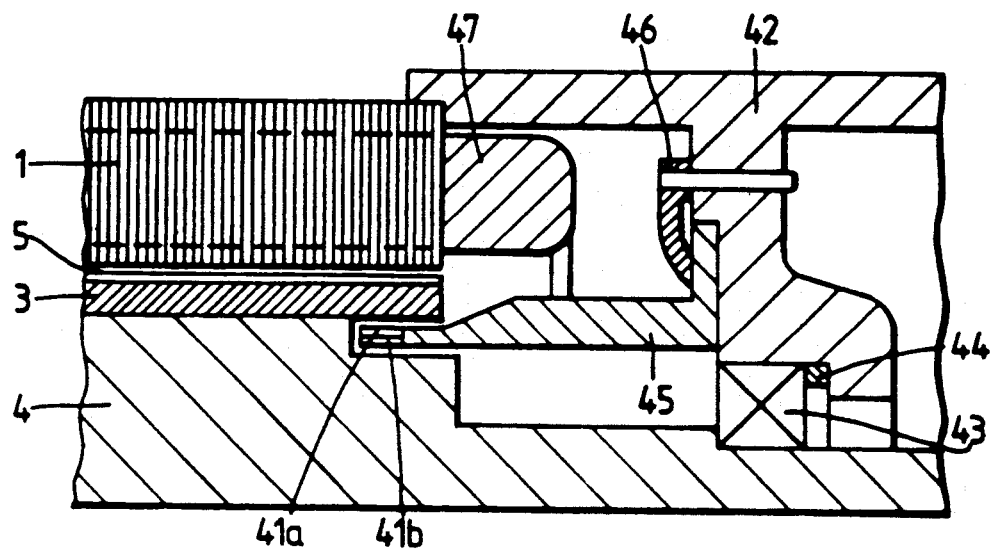
FIG. 18 shows a favoured disposition for Hall effect devices in a brushless DC motor.

An advantageous arrangement of rotor position sensing by the use of Hall effect devices may be achieved by the arrangement shown in FIGS. 18. As is well known, Hall effect devices provide contact free sensing and operate up to High temperatures. In order to minimise the motor length, the Hall effect devices 41a of the sensor are operated by the magnets 3 which produce the main motor field flux, thus eliminating the length occupied in the case of a conventional design by a separate position sensor. In order to guarantee reliable information from the Hall devices when placed in the vicinity of the strong magnetic fields produced by the large motor currents, the positioning of the Hall devices underlying an axial end portion of the rotor magnets is important, so that the field produced by the motor currents is negligible in the vicinity of the Hall devices compared with that created by the magnets 3. In addition, in order that there is an airgap to one side only of the Hall devices, they are underlaid by a steel flux return ring 41b, against which they are directly juxtaposed. Thus there is an airgap on the radially outward sides only of the devices, between them and the magnets 3, and they are backed on their radially inwards sides by the flux return ring. Ring 41b serves to intensify the field strength in an advantageous manner.

As well as the items already indicated in connection with FIG. 1, including the motor shaft 4 on which the magnets 3 are mounted and retained, FIG. 18 also shows rear end bell 42 within which the shaft turns in bearing 43. Axial thermal expansion between the axially outward end of bearing 43 and end bell 42 is taken up or accommodated by wavey washer 44. The Hall devices are disposed at the free axial ends of nylon posts 45, which are mounted on the end bell by means of adjustable clamps 46. The axial ends of the magnets thus overlie the Hall devices which are triggered by the transitions between successive poles, i.e. by polarity changes. The switches are positioned so as to give the required signals at the appropriate stages of each electrical cycle. The switches and their mounting posts 45 are thus located in otherwise unused space underlying the axial ends 47 of the windings.

In order to reduce motor temperature, i.e. to reduce losses due to switching in a motor, it is usual to use a choke of the order of one to several millihenries in series with a DC motor. In the case of brushless three phase motors, one such choke must be used in each of the motor phases. While providing an effective solution to the problem of motor heating, the inclusion of such chokes in a brushless DC drive system may frequently be impractical and is necessarily expensive.

Figure 19A:
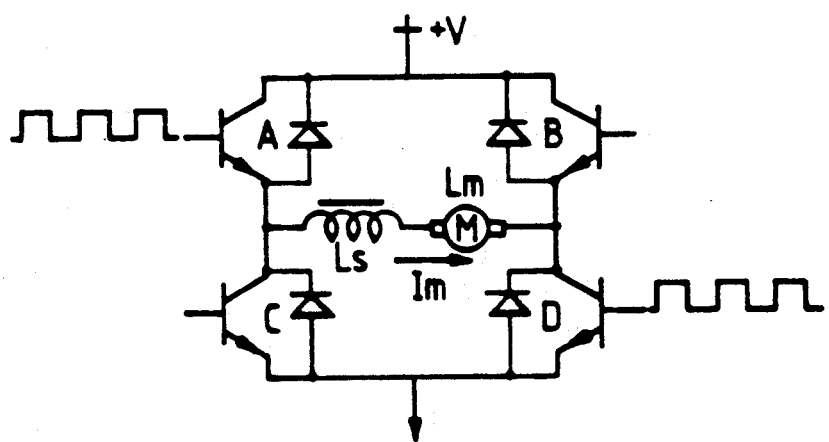
FIG. 19A shows a conventional pulse width modulation system for a prior art brushless DC drive.
Figure 19B:
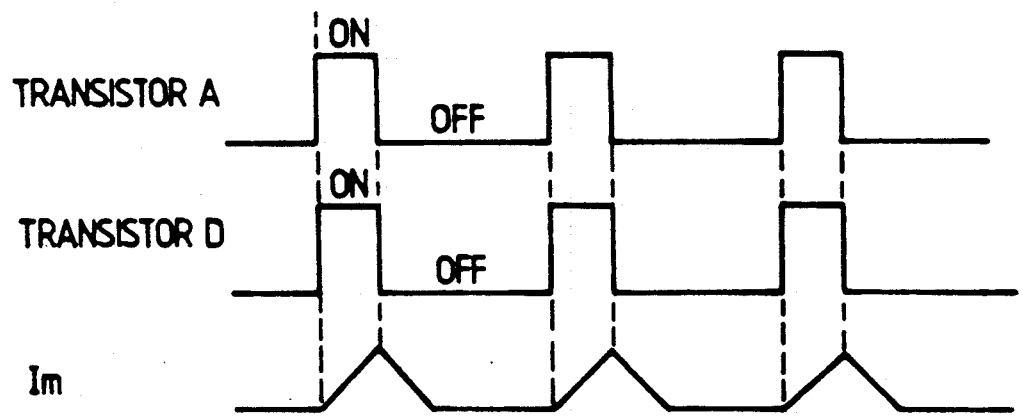
FIG. 19B is a diagrammatic representation of the transistor switching and current flow in the PWM system of FIG. 19A.
Figure 20A:
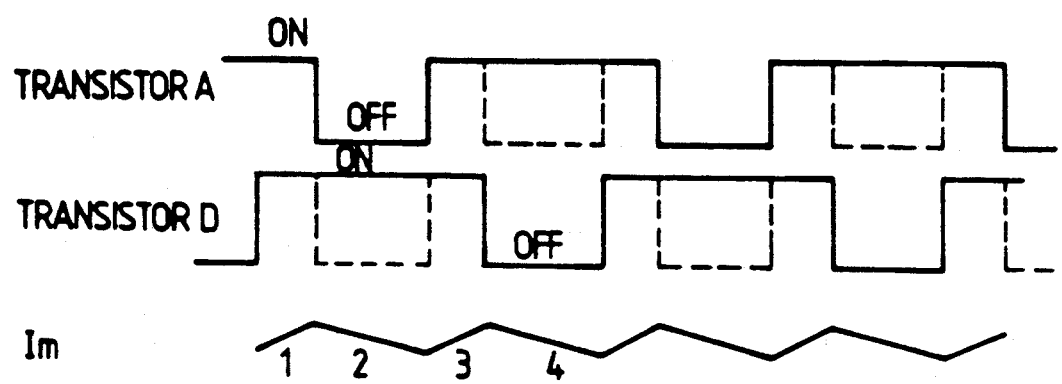
FIG. 20A shows a prior art modulation technique for reducing current ripple.
Figure 20B:
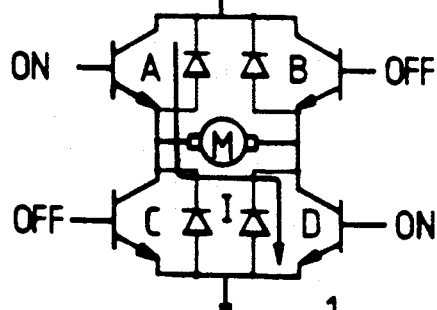
FIGS. 20B, 20C, 20D and 20E show the path of current flow in a PWM switching system operating in accordance with the stages identified in FIG. 20A.
Figure 20D:
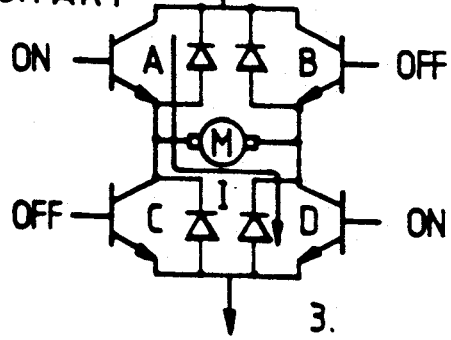
Figure 20C:
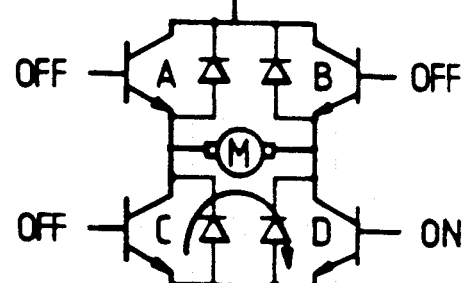
Figure 20E:
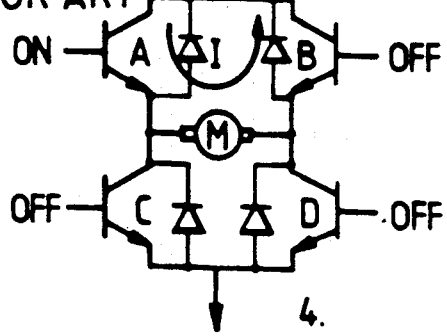
Figure 21:
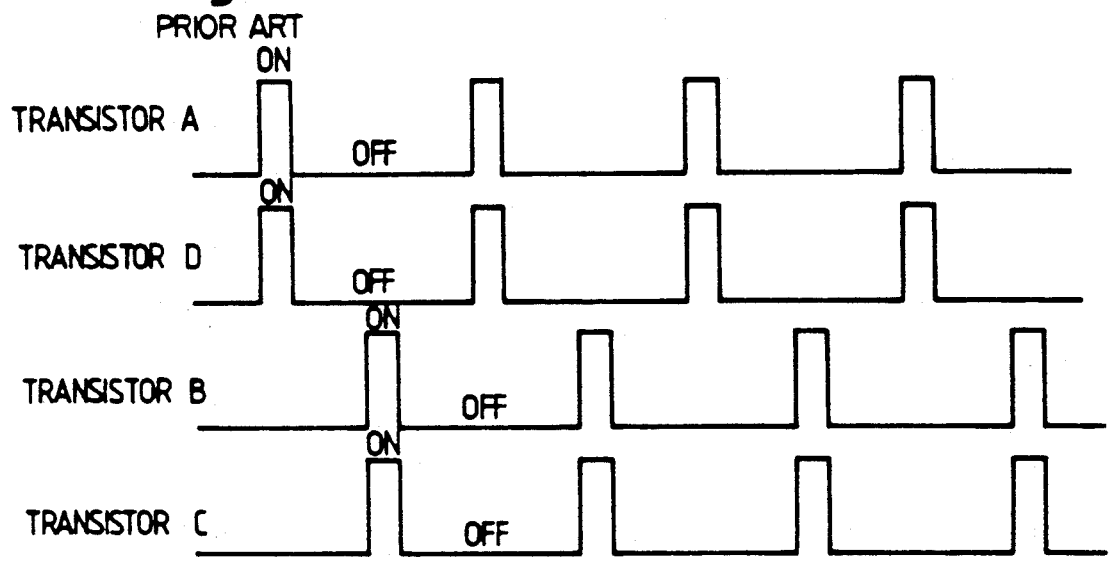
FIG. 21 shows the switching requirement for the prior art technique of FIG. 20A at zero speed in a servo drive.

FIG. 19A shows a prior art standard pulse width modulating system in which pulses are supplied simultaneously to transistors A and D (and in turn B and C) in order to maintain a current Im in the motor. Each transistor in the circuit of FIG. 19 has an associated flyback diode. This arrangement results in a relatively rapid rate of decay of the flyback current, so that the ripple current, which determines the heating, is relatively large, as indicated in FIG. 19B. The rate of rise and fall of current in such a system is controlled by both the DC bus voltage (+V) and the total load inductance (Ls plus Lm). Hence the problem of large current ripple, and thus motor heating, is more acute for low inductance loads and for high voltage converters. The prior art modulation technique shown in FIG. 20A tackles this problem by maintaining a transistor "on" between the two firing pulses, so that the flyback current will flow through a different circuit, as shown in each of FIGS. 20B through 20E for each transistor "on" combination, and the rate of current decay will be slower than the rate of rise. Thus the current ripple is reduced. Such an arrangement is effective for large currents and for single ended loads but presents difficulties in application at low currents and zero speed. High performance servo drives require a high degree of stiffness and no dead band over the whole area of the four quadrants of the torque/speed curve. To achieve this a small bias current may be applied to the motor in the zero speed condition to ensure zero stiffness and no dead band. Thus the zero speed switching condition shown in prior art FIG. 21 is required, in which the modulation technique of FIG. 20A becomes quite clearly impossible, in that if transistor D were to remain on during the off period, this would result in "shoot-through" when transistor B turns on.

Figure 22:
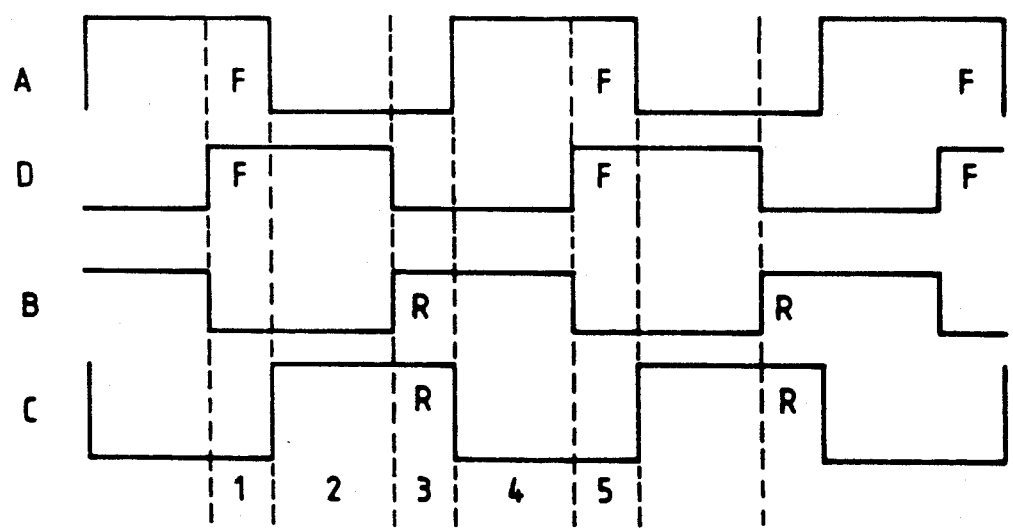
FIG. 22 shows a novel modulation technique for a PWM system in a brushless DC drive under no load conditions.

An improved modulation technique illustrated in FIG. 22 allows bias current operation near zero together with the application of a "lock up" technique to the transistors from zero to full current. In addition, circulating or flyback currents are shared equally between the flyback diodes. The no load condition shown in FIG. 22 illustrates clearly that at zero speed there is an equal and opposite alternating bias current flowing in the motor, the forward pulses F being established by the overlap between the on periods of transistors A and D and the reverse pulses R being established by the overlap between the on periods of transistors B and C. In addition transistor A operates on the inverse signal of transistor C, as do the B and D transistors. Thus the switching cycle is:

1. Transistors A and D on. Current flows in the forward direction through the motor.
2. Transistor A turns off. Flyback current flows in flyback diode C and transistor D. The base drive signal is applied to transistor C which carries no current, due to the conduction of flyback diode C.
3. Transistors B and C on. Current flows in the reverse direction through the motor.
4. Transistor C turns off. Flyback current flows in flyback diode A and transistor B. Transistor A carries no current due to conduction by flyback diode A.

Figure 23:
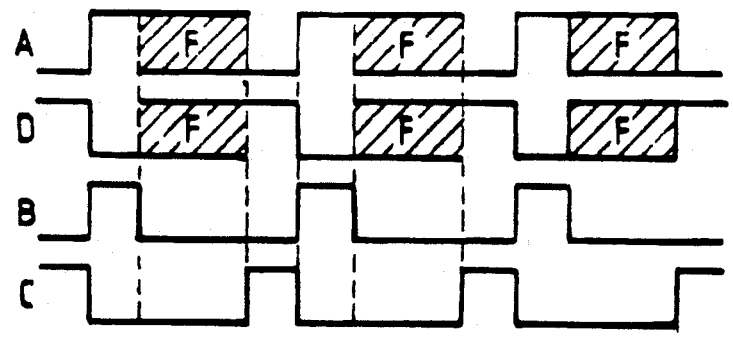
FIG. 23 shows the technique of FIG. 22 under load.

Under load, the base drive waveforms shown in FIG. 23 apply. Forward pulses F are established by the overlap between the on periods of transistors A and D but there are now no reverse pulses, since there is no overlap between the on periods of transistors B and C. The base drive signal for transistor C is the inverse of that for A, while that for transistor D is the inverse of that for B. Thus there exists the danger of shoot-through, since there is no delay or dead time between switching off transistor A and switching on transistor C. Accordingly a delay, for example, of 10 microseconds, must be added to each on signal in the base drive section, to avoid the occurrence of a shoot-through condition.

When forward current flows, transistors B and C are also switching but no losses are associated with this. Even though a base drive signal is applied to these transistors, no collector current can flow, because the flyback diode associated with each of these transistors is conducting during some of the notional "on" time for the transistor, so that the transistor is reverse biassed.

Since the B and C "on" signals do not occur together at any point, a complete circuit for the collector current is never created. Thus the system provides a notional switching of these transistors but no switching or steady state losses are incurred.

Figure 24:
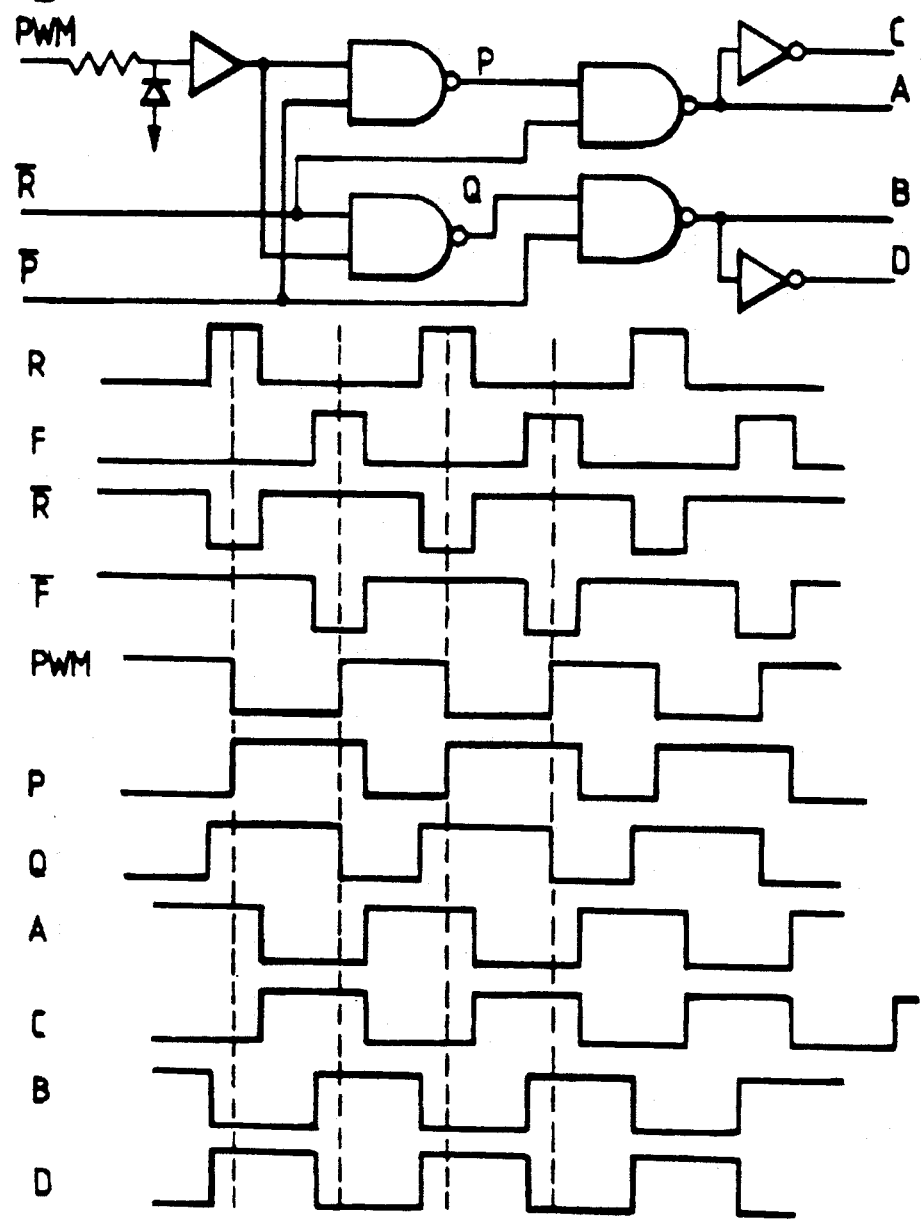
FIG. 24 shows an implementation of the modulation technique of FIGS. 22 and 23.

The circuit arrangement shown schematically in outline in FIG. 24 combines a square wave with standard pulses through a series of NAND gates. F bar represents the inverse of a standard technique forward pulse, while signal R bar is the inverse of a standard technique reverse pulse. PWM is the square wave from which the PWM sawtooth signal is normally derived. The system described has the particular advantage that "gear-changing" is not required. Thus the same modulation technique is used not only about the zero point but also at higher values of load current. Accordingly there is no disturbance on the motor shaft at any stage, which would occur if there were a "gear change" or modulation technique change.

This heat minimizing PWM technique is especially useful in brushless DC drives but is in not limited to such drives and may also be applied to DC motors of other kinds and for inductive loads in general.

Figure 25:
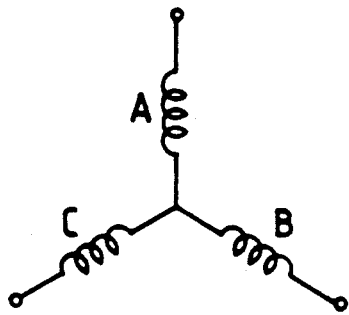
FIG. 25 shows a star connection for a brushless DC drive.

In the three phase systems described hereinabove, star mode is used, with the three motor phases being internally connected and current applied to the three external phase ends. This arrangement is shown in FIG. 25, along with the sequence of phase combinations followed as the motor turns through an electrical cycle. Each phase carries current for two consecutive working strokes, is switched off for one working stroke and then carries current in the opposite direction for the next two. The terminal torque sensitivity is twice the phase torque sensitivity, and, as each phase current is a square wave with a two:one mark space ratio, the RMS current is the square root of two thirds of the peak current. In order to provide a drive capable of delivering high torque with low speed and running to high speed at low torque levels, a star/delta changeover technique may be employed which doubles the speed range of a given three phase full wave inverter drive with minimal addition to system cost or complexity.

Figure 26:
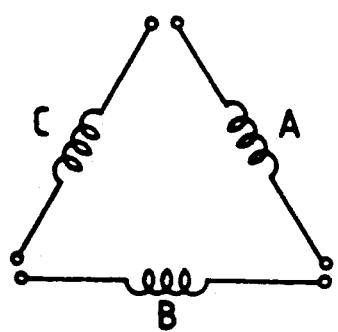
FIG. 26 shows a delta connection for a brushless DC drive.

Delta mode, in which only a single phase is active at any one time, is shown in FIG. 26. The phase sequence shows that each phase carries current for one period in three and the RMS current is the square root of one third of the peak current. Terminal torque sensitivity is thus equal to phase torque sensitivity in this case.

Figures 27A, 27B:
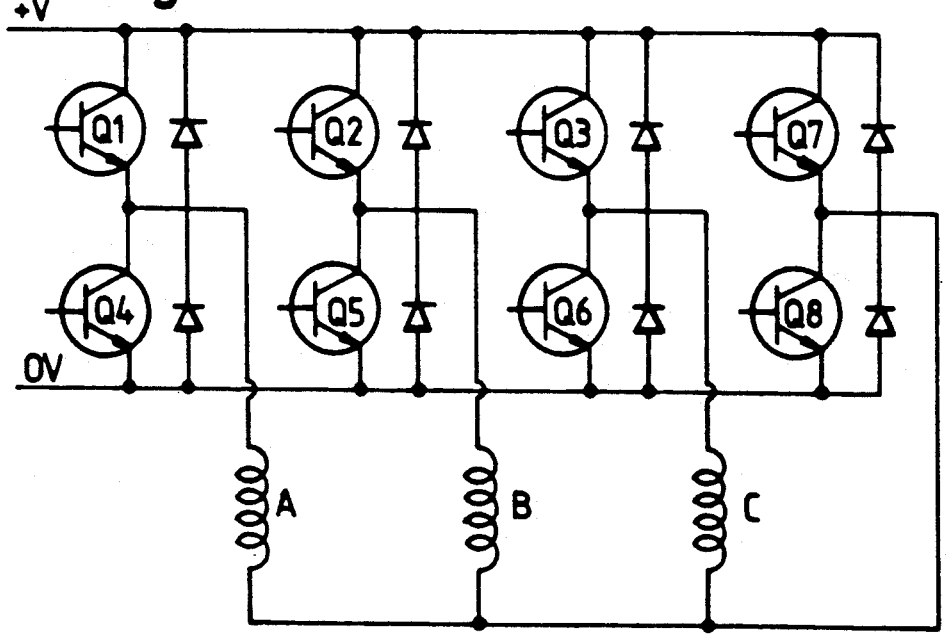
FIGS. 27A and 27B show a star/delta inverter bridge, together with the operating sequences in both the star and delta modes.
Figure 28:
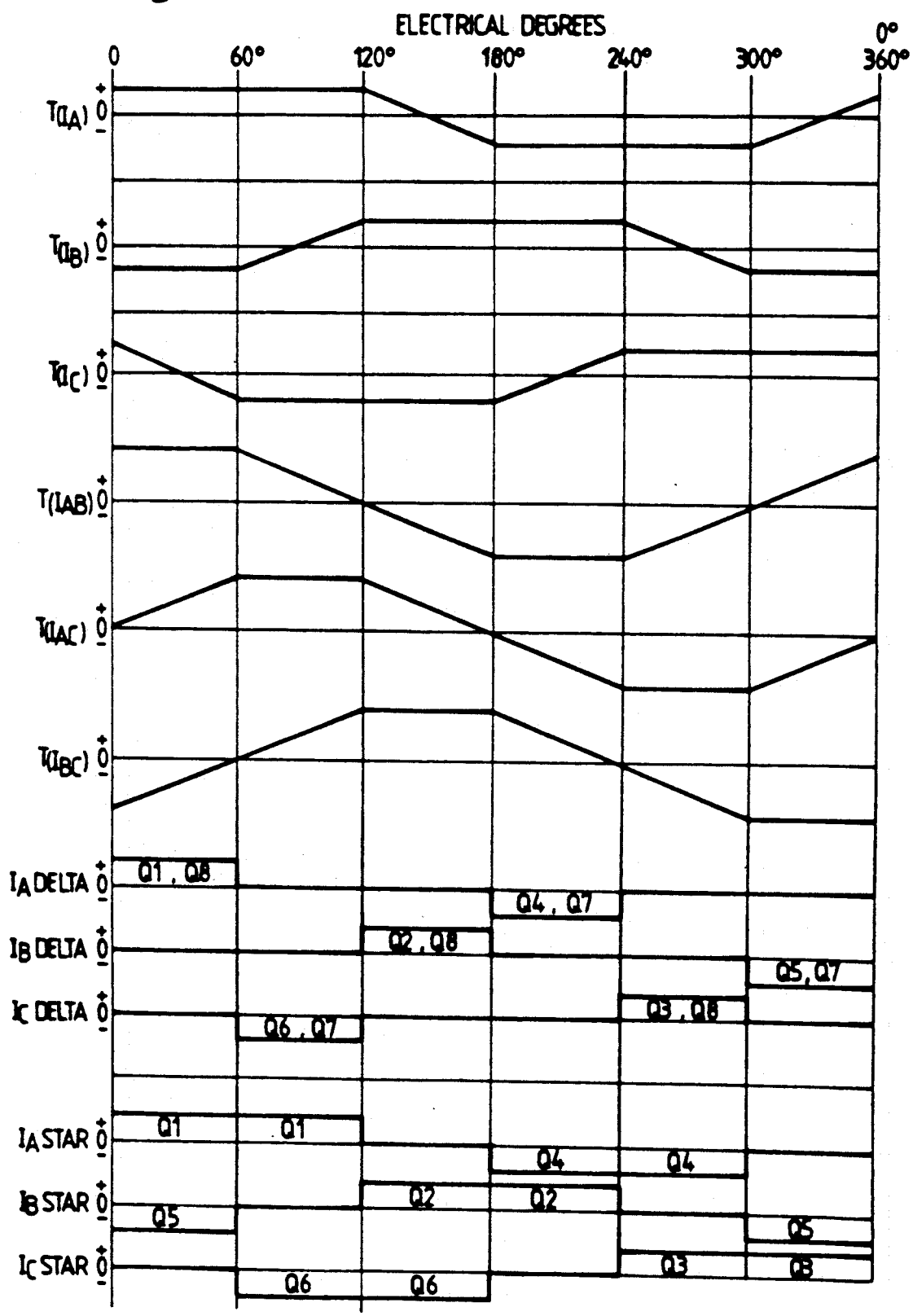
FIG. 28 shows a torque sensitivity and current timing diagram for the system of FIGS. 27A and 27B.

FIGS. 27A and 27B show a power circuit for implementation of star/delta changeover without any interruption of motor rotation or any physical change, e.g. operation of a switch, in the circuit, together with the operating sequences in both the star and delta modes. A standard full-wave three phase inverter bridge is associated with two extra power devices controlling the neutral point of a star-connected three phase winding. FIG. 28 is a timing diagram for this circuit, from which it may be seen that when the drive is in star mode, transistors 7 and 8 are not used, while in delta mode only one of the transistors 1 to 6 is on at any one time and either transistor 7 or 8 is on in every commutation cycle, to provide a return path.

Figure 29:
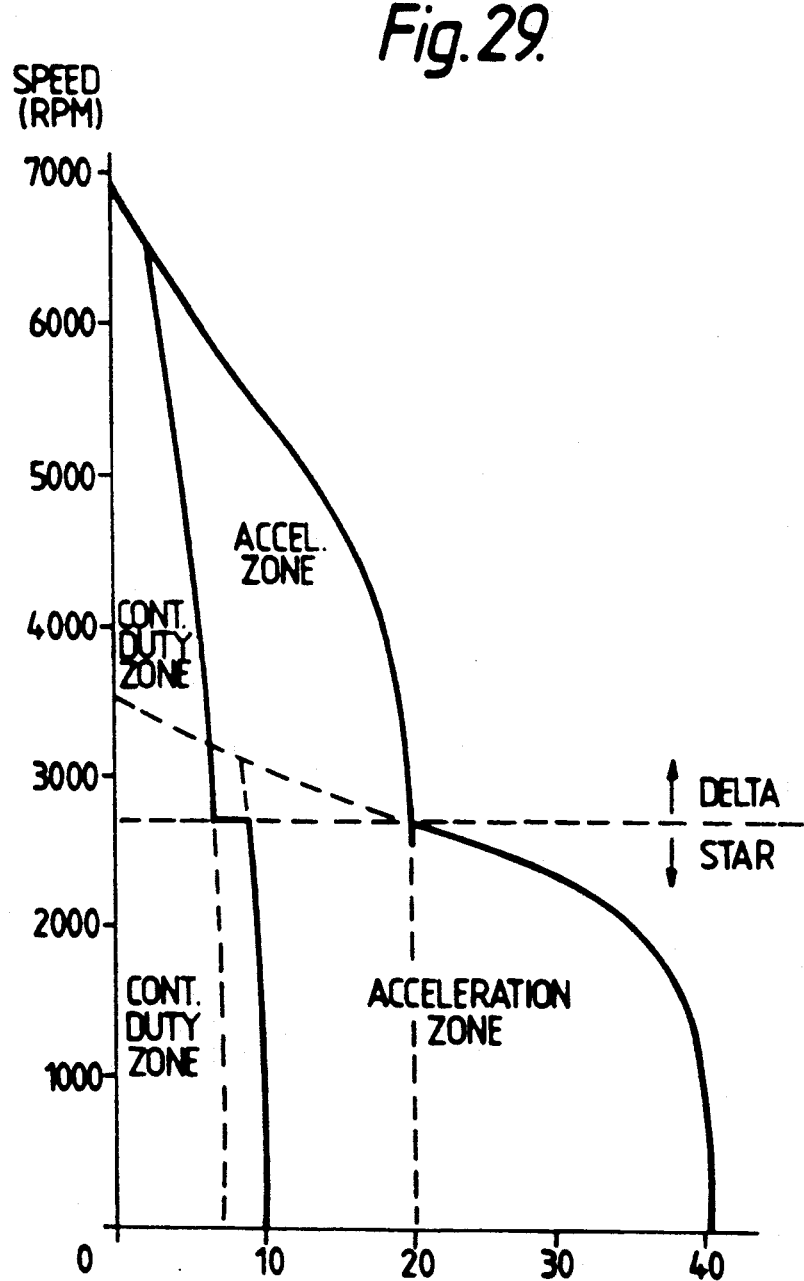
FIG. 29 shows a performance curve for a brushless DC drive having a star/delta transition.

An example of torque speed characteristic obtainable with such a combination is shown in FIG. 29. At low speed the drive operates in star mode and so sees a motor torque sensitivity equal to twice that of the single phase. A comparator from the speed feedback device detects if the drive exceeds a preset speed corresponding to the optimum point for transfer from star to delta mode. In the example show, this speed is about 2,700 rpm, and is thus below the maximum speed and peak torque of 3,500 rpm and 40 NM respectively of the star mode configuration. Above this 2,700 rpm threshold, the control logic is changed from star to delta mode so that the motor torque sensitivity is halved.

Figure 31:
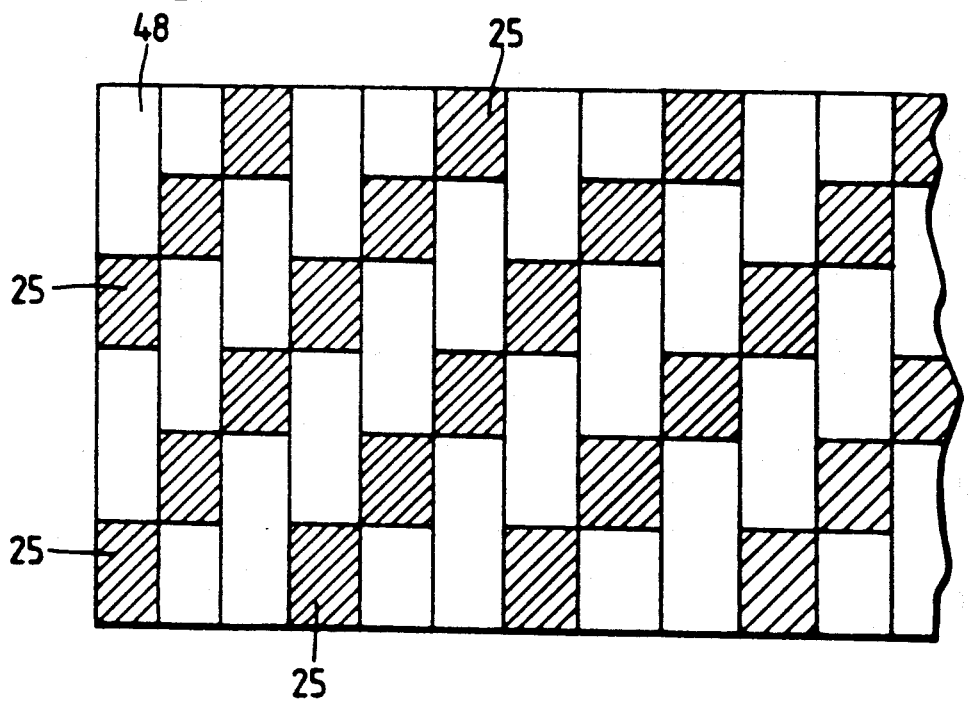
FIG. 31 is a development of the cooling fin arrangement of FIG. 30.
Figure 30:
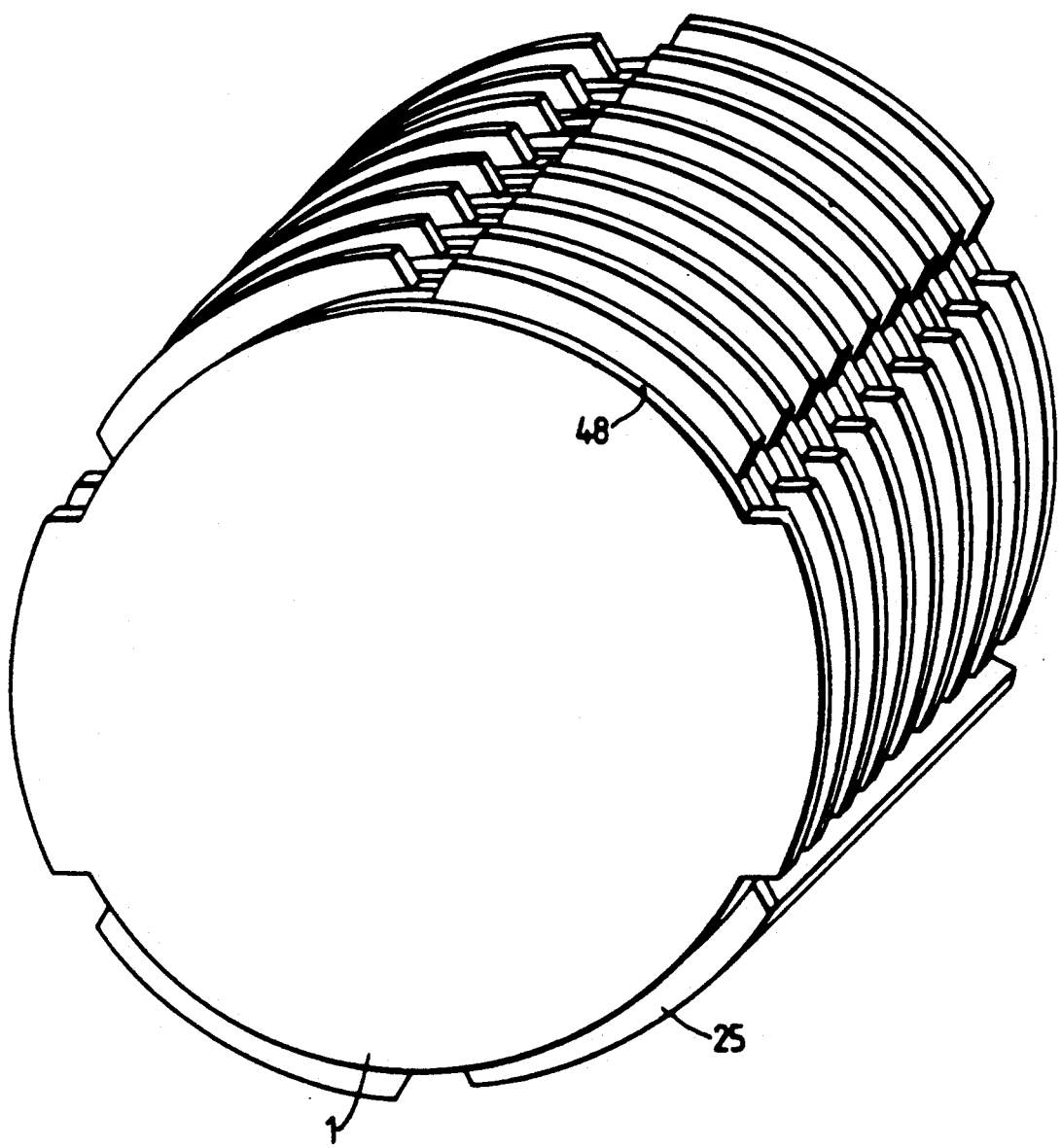
FIG. 30 is a pictorial view of a cooling fin arrangement for stator laminations in accordance with FIG. 8.

FIGS. 30 and 31 show in pictorial and development views respectively, a cooling fin arrangement provided on the external periphery of the stator lamination 1 of FIG. 8. Each fin 15 extends over 60° mechanical of this periphery. A small number of laminations, indicated by reference 48, typically three, are arranged with their fins overlying. The next group of laminations along the axial length of the motor have their fins displaced by 120° relative to the group first mentioned, so that a continuous two start spiral fin arrangement along the axial length of the stator is provided. These cooling fins are found to be exceedingly effective and a 20% improvement in motor output is typical. This result is achieved by enhancement of the surface area and may be employed on any laminated stator and not merely those of the brushless DC drive systems to which the present invention particularly relates.

We claim:

1. A direct current electric motor comprising a stator having a plurality of winding slots, a plurality of stator teeth defined between the winding slots, and a plurality of dummy slots, each dummy slot comprising a notch in a radially inner face of a stator tooth, and a rotor having a plurality of poles, the stator surrounding the rotor and having an internal periphery, and the rotor having an external periphery, an airgap existing between said internal periphery of the stator and said external periphery of the rotor and said airgap having a radial dimension between said external periphery of the rotor and said internal periphery of the stator, the rotor being mounted for displacement relative to the stator, reluctance forces prevailing between the rotor and the stator as a result of presence of the winding slots and the dummy slots, and these forces varying as the poles of the rotor pass by the slots, the stator having two dummy slots between a pair of adjacent winding slots at each of a first plurality of locations which are equally spaced around said internal periphery of the stator, the stator being provided with one dummy slot between a pair of adjacent winding slots at each of a second plurality of locations around said internal periphery of the stator, a plurality of said second plurality of locations being interposed between each of said first plurality of locations and another of said first plurality of locations spaced from said each of said first plurality of locations around said internal periphery of the stator, and each notch of said dummy slot being dimensioned to behave similarly to a winding slot in respect of reluctance torque, each dummy slot having a width dimension which is substantially the same as the width dimension of a winding slot and a depth dimension which is large compared with the radial dimension of said airgap between said external periphery of the rotor and said internal periphery of the stator, so that during relative displacement of the rotor and stator, the reluctance forces prevailing between the rotor and the stator due to the presence of the dummy slots are substantially the same as the reluctance forces prevailing between the rotor and the stator due to the presence of the winding slots.

2. A motor according to claim 1, wherein said first plurality of locations at each of which the stator has said two dummy slots between said pair of adjacent winding slots comprises three locations and the stator has said one dummy slot between each pair of adjacent winding slots not having said two dummy slots therebetween.

3. A motor according to claim 2, wherein the winding slots and the dummy slots are equally spaced around said internal periphery of the stator so that all of the slots are at an equal angular spacing.

4. A motor according to claim 2, wherein the motor comprises a plurality of phase windings and the angular spacing between each winding slot and its preceding winding slot within an angular stator increment corresponding to an electrical cycle is equal.

5. A motor according to claim 4, wherein the motor is a three-phase motor and said angular spacing between each winding slot and its preceding winding slot within said angular stator increment is 20°.

6. A direct current electric motor comprising a stator and a rotor, the stator having a plurality of winding slots and a plurality of stator teeth defined therebetween, and the rotor having a plurality of rotor poles, the stator surrounding the rotor and having an internal periphery, and the rotor having an external periphery, an airgap existing between said internal periphery of the stator and said external periphery of the rotor, each of a first plurality of stator teeth having two dummy slots, each of a second plurality of stator teeth having one dummy slot, a plurality of stator teeth of said second plurality of stator teeth being interposed between each stator tooth of said first plurality of stator teeth and any other stator tooth of said first plurality of stator teeth, and each dummy slot having a width dimension which is substantially the same as the width dimension of a winding slot and a depth dimension which is large compared with the radial dimension of said airgap between said external periphery of the rotor and said internal periphery of the stator, so that during relative displacement of the rotor and the stator, reluctance forces prevailing between the rotor and the stator due to the presence of the dummy slots are substantially the same as reluctance forces prevailing between the rotor and the stator due to the presence of the winding slots.

7. A motor according to claim 6, comprising three stator teeth, each of which has said two dummy slots, and at least two stator teeth, each of which has said one dummy slot, between each two of said three stator teeth, each of which has said two dummy slots.

* * * * *